United States Patent
Liu

(10) Patent No.: US 8,463,141 B2
(45) Date of Patent: *Jun. 11, 2013

(54) RECONSTRUCTION AND RESTORATION OF TWO POLARIZATION COMPONENTS OF AN OPTICAL SIGNAL FIELD

(75) Inventor: Xiang Liu, Marlboro, NJ (US)

(73) Assignee: Alcatel Lucent, Paris (FR)

( * ) Notice: Subject to any disclaimer, the term of this patent is extended or adjusted under 35 U.S.C. 154(b) by 1273 days.

This patent is subject to a terminal disclaimer.

(21) Appl. No.: 12/002,006

(22) Filed: Dec. 14, 2007

(65) Prior Publication Data

US 2009/0074428 A1 Mar. 19, 2009

Related U.S. Application Data

(60) Provisional application No. 60/993,823, filed on Sep. 14, 2007.

(51) Int. Cl.
*H04B 10/142* (2006.01)
*H04B 10/60* (2006.01)

(52) U.S. Cl.
CPC ..................................... *H04B 10/60* (2013.01)
USPC ........... 398/203; 398/204; 398/205; 398/206; 398/207

(58) Field of Classification Search
USPC .................................................. 398/203–207
See application file for complete search history.

(56) References Cited

U.S. PATENT DOCUMENTS

| | | | | |
|---|---|---|---|---|
| 5,930,310 A | * | 7/1999 | Freeman | 375/346 |
| 7,529,490 B2 | * | 5/2009 | Hoshida | 398/207 |
| 2004/0218932 A1 | * | 11/2004 | Epworth et al. | 398/202 |
| 2006/0013590 A1 | * | 1/2006 | Hueda et al. | 398/149 |
| 2006/0193640 A1 | * | 8/2006 | Katagiri et al. | 398/188 |

FOREIGN PATENT DOCUMENTS

EP 1708391 A 10/2006

OTHER PUBLICATIONS

Diego E. Crivelli et al, Adaptive Digital Equalization in the Presence of Chromatic Dispersion, PMD, and Phase Noise in Coherent Fiber optic Systems—IEEE Communications Society, Globecom 2004 pp. 2245-2551.
Agere Systems, Polarization Controller Overview—Jun. 2002—pp. 1 to 7.
T. Merker et al, PMD Compensation Up to Second Order by Tracking thr Principle States of Polarization Using a Two-Section Compensator—Oct. 15, 2001—pp. 1 to 7.

(Continued)

*Primary Examiner* — Danny Leung
(74) *Attorney, Agent, or Firm* — E. J. Rosenthal

(57) ABSTRACT

A digital version of both amplitude and phase of at least one generic polarization component of a received optical signal is developed using dual-polarization direct differential detection with digital signal processing. The received signal is split into orthogonal polarization components, each of which is split into three copies. For each orthogonal polarization component a) an intensity profile is conventionally obtained using a copy and b) phase information is obtained by supplying each remaining copy to a respective one of a pair of optical delay interferometers having orthogonal phase offsets, followed by respective balanced intensity detectors. The outputs the balanced intensity detectors and the intensity profiles are converted into digital representations and used to develop, via signal processing, the optical field information of at least one generic polarization component of the received optical signal. Compensation of impairments, such as PMD, is realized through further processing.

47 Claims, 9 Drawing Sheets

OTHER PUBLICATIONS

Henrik Sunnerud et al, A Comparison Between Different PMD Compensation Techniques—Journal of Lightwave Technology, vol. 20 No. 3, Mar. 2002—pp. 1 to 11.

Fred Heismann, Analysis of a Reset-Free Polarization Controller for Fast Automatic Polarization Stabilization in Fiber-optic Transmission Systems—Journal of Lightwave Technology, vol. 12 No. 4, Apr. 1994—pp. 1 to 10.

Ezra Ip et al, Digital Equalization of Chromatic Dispersion and Polarization Mode Dispersion, Journal of Lightwave Technology, vol. 25, No. 8, Aug. 2007, pp. 1 to 11.

J.P. Gordon et al., Review—PMD Fundamentals: Polarization Mode Dispersion in Optical Fibers, Feb. 2, 2000, pp. 1 to 10.

Tseytlin M et al: "Digital, Endless Polarization Control for Polarization Multiplexed Fiber-Optic Communications," Optical Fiber Communication Conference (OFC). Postconference Digest. Atlanta, GA. Mar. 23-28, 2003; [Trends in Optics and Photonics Series. (TOPS)], Washington, DC: OSA, US vol. TOPS.vol. 86, Mar. 23, 2003, pp. 103-103, XP010680181 ISBN: 978-1-55752-746-2, the whole document.

Pfau T et al: "PDL-Tolerant Real-Time Polarization-Multiplexed QPSK Transmission With Digital Coherent Polarization Diversity Receiver," LEOS Summer Topical Meetings, 2007 Digest of the IEEE, IEE, PI, Jul. 1, 2007, pp. 17-18, XP031125301 ISGM: 978-1-4244-0926-6, the whole document.

Griffin R. A. et al: "10 Gb/s Optical Differential Quadrature Phase Shift Key (DQPSK) Transmission Using GaAs/AlGaAs Integration," Optical Fiber Communications Conference (OFC). Postconference Technical Digest. Postdeadline Papers (IEEE CAT. No. 02CH37339) Opt sec. America Washington, DC, USA, vol. 2, Mar. 22, 2002, pp. FD6-1, XP002503799, ISBN: 1-55752-701-6, the whole document.

PCT International Search Report dated Nov. 26, 2008 (PCT/US2008/010322)4 pages.

I. Bar-David "Direct Differential Detection of Phase-Shift Keyed Signals: A Local-Oscillatorless DPSK Receiver" IEE Proc.-Optoelectron, vol. 141, No. 1, Feb. 1994—5 pages.

\* cited by examiner

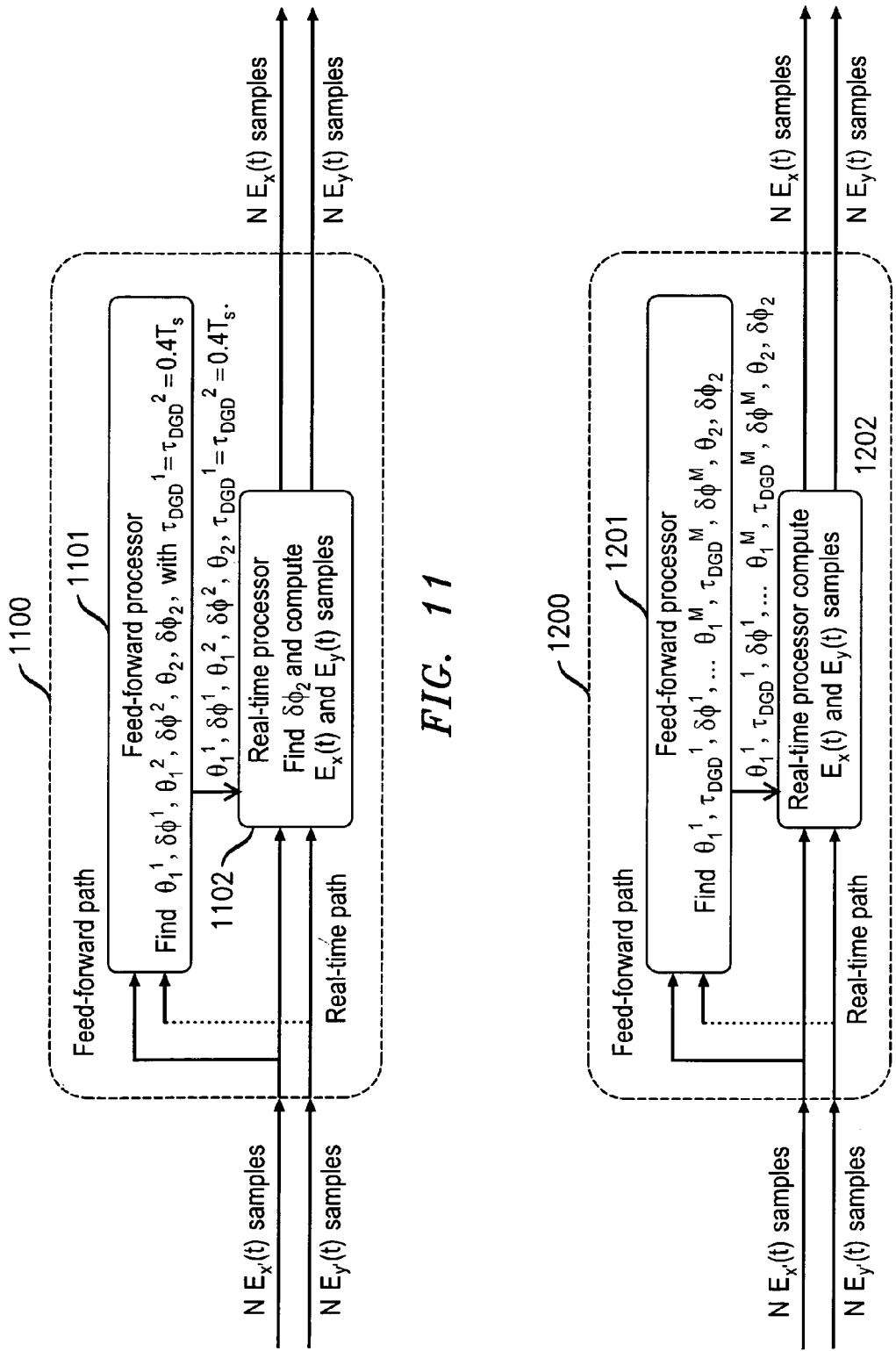

RECONSTRUCTION AND RESTORATION OF TWO POLARIZATION COMPONENTS OF AN OPTICAL SIGNAL FIELD

CROSS-REFERENCE TO RELATED APPLICATIONS

This application claims benefit of U.S. provisional patent application Ser. No. 60/993,823, filed Sep. 14, 2007, which is herein incorporated by reference.

TECHNICAL FIELD

This invention relates to the reconstruction of the two polarization components of an optical signal field and compensation for polarization-mode dispersion.

BACKGROUND OF THE INVENTION

As is well known, an optical signal may have two orthogonal polarization states, each of which may have different properties. Sometimes such polarization states are intentionally introduced, such as in creating a polarization-multiplexed signal in which the two orthogonal polarization states of the optical carrier are arranged so that each carries different data in order to double the spectral efficiency. Such a polarization-multiplexed signal has two so-called "generic" polarization components, each of which carries a single data modulation. Note that by a generic polarization component it is generally intended the signal at the point at which the modulation of that polarization component is completed. It should be appreciated that each generic polarization component may initially, or otherwise, exist separate from the other generic polarization component with which it is later combined.

The polarization orientations of the generic signal components are generally changed by the birefringence of the fiber, and possibly other fiber properties, during the passage of the signal over the optical path. Such changes may be time varying because at least the fiber birefringence is typically a function of various factors such as ambient temperature, mechanical stress, and so forth, which may vary over time and be different at various points of the transmission path. As a result, the polarization orientation of each of the generic signal components is generally unknown at the receiver.

Sometimes, undesirably, the fiber birefringence is so large that polarization-mode dispersion (PMD) is caused, i.e., a generic optical signal component is decomposed into two orthogonal polarization components along the two principle state of polarization (PSP) axes of the fiber, along one of which the light travels at its fastest speed through the fiber and along the other of which the light travels at its slowest speed through the fiber. In such a case, not only may the phase relationship between the two polarization components be time varying, but also each of the two orthogonal polarization components may arrive at the receiver at different times due to the PMD-induced differential group delay (DGD) between the two PSP axes. Note that, actually, as suggested above, each small section of the fiber behaves as if it is its own mini fiber that introduces its own DGD between the two PSP axes. However, for simplification purposes, one may treat the fiber as a single DGD element that introduces a certain DGD between the two axes, based on a first order approximation of the PMD. Thus, for a particular fiber or optical link, PMD is a stochastic effect, and the PMD-induced DGD may also be time varying.

Other linear effects distort optical signals transmitted over optical fibers. Such effects include chromatic dispersion (CD). Optical compensation methods are typically employed to reduce signal distortion that arises due to CD or PMD.

Electronic chromatic dispersion compensation (EDC) has recently emerged as a technique that can flexibly reduce the distortion induced by CD in a cost effective manner. As explained by M. S. O'Sullivan, K. Roberts, and C. Bontu, in "Electronic dispersion compensation techniques for optical communication systems," ECOC'05, paper Tu3.2.1, 2005, EDC can be performed at the transmitter. Alternatively, EDC can be performed at the receiver. As described by S. Tsukamoto, K. Katoh, and K. Kikuchi, in "Unrepeated Transmission of 20-Gb/s Optical Quadrature Phase-Shift-Keying Signal Over 200-km Standard Single-Mode Fiber Based on Digital Processing of Homodyne-Detected Signal for Group-Velocity Dispersion Compensation," IEEE Photonics Technology Letters, Volume 18, Issue 9, 1 May 2006, pp. 1016-1018, EDC is implemented with a coherent-detection receiver. In addition, EDC can be implemented with a special direct differential detection receiver as explained by X. Liu and X. Wei, in U.S. patent application Ser. No. 11/525,786 entitled "Reconstruction and Restoration Of Optical Signal Field", filed on Sep. 22, 2006 and assigned to Lucent Technologies, which is incorporated by reference as if set forth fully herein and shall be referred to hereinafter as Liu-Wei.

Unlike CD, PMD in a fiber link may change very rapidly and PMD compensation usually has to be done in the receiver. Electronic PMD compensation (EPMDC) has also attracted attention recently for its potential cost effectiveness. As explained by J. Hong, R. Saunders, and S. Colaco, in "SiGe equalizer IC for PMD Mitigation and Signal Optimization of 40 Gbits/s Transmission", published in Optical Fiber Communication Conference 2005, paper OWO2. However, the capability of the EPMDC with a conventional direct-detection receiver is quite limited in that the improvement in PMD tolerance is usually only about 50%.

SUMMARY OF THE INVENTION

In accordance with the principles of the invention, a digital version of the complex field, i.e., both amplitude and phase, e.g., with respect to a reference point, of each of two orthogonal polarization components of a received optical signal are developed at a receiver by employing a dual-polarization direct differential receiver portion that uses direct differential detection to develop a digital representation of optical signals derived from each of two orthogonal polarization components of a received optical signal which are then processed using digital signal processing (DSP) to develop a digital representation of an intensity and a phase profile representing the polarizations as received at the receiver. The reconstructed digital versions of the complex field of each of the two orthogonal polarization components of the optical signal as received at the receiver are then be further processed jointly to develop at least one so-called "generic" polarization component of the received optical. Note that due to fiber birefringence or PMD, the two orthogonal polarization components of the optical signal as received at the receiver after fiber transmission are generally not the generic polarization components of the signal. In accordance with an aspect of the invention, during the joint processing the relative phase difference between the two reference points used in the two reconstructed optical fields is determined. This may be achieved by employing a searching technique.

In one embodiment of the invention, a polarization beam splitter (PBS) is first used to separate the received optical signal into two arbitrarily orthogonal polarization components, $E_{x'}$ and $E_{y'}$. Each of the orthogonal polarization components is supplied to a special direct differential detection receiver, which employs a special pair of optical delay interferometers (ODIs) with a phase delay difference of about $\pi/2$, such as are described in Liu-Wei and which are herein referred to as an I/Q ODI pair. At least the four outputs of each I/Q ODI pair are then detected by two balanced detectors, whose two outputs are sampled by respective analog to digital converters (ADCs), are then processed to obtain a digital representation of the received signal optical field along the corresponding polarization axis, i.e., x' or y', according to Liu-Wei.

In a second embodiment of the invention, the received optical signal is supplied directly into a single polarization-independent I/Q ODI pair and the resulting four outputs are each connected to a respective associated one of four PBSs, all of which have the same polarization orientation. Each of the PBS produces two outputs, so that in total there are eight outputs from the four PBSs, consisting of four outputs derived from the first polarization, e.g., x'-polarized outputs, and four outputs derived from the second polarization, e.g., y'-polarized outputs. Each pair of outputs of the PBSs that corresponds to a single optical delay interferometer and a single polarization are supplied to a respective one of four balanced detectors, whose outputs are sampled by a respective one of four corresponding ADCs. Each of the resulting sampled waveforms are then processed to obtain a digital representation of the received signal's optical field along each of the polarization axes x' and y' in the manner described in Liu-Wei.

Even though this second embodiment requires the use of three additional PBSs as compared to the first embodiment, due to the relative cost of I/Q ODIs themselves and the control electronics associated therewith, as compared to the cost of PBSs, advantageously, because only one I/Q ODI pair is employed, significant cost savings can be achieved. Furthermore, the second embodiment may be more compactly implemented.

Either embodiment of the invention may be implemented with free space or fiber based optics, or any combination thereof.

Although to save cost it is expected that implementers generally will approximate the intensity profile of one or more of the polarization components of the received signal from the absolute value of their respective complex waveforms, they may instead employ direct intensity detection to obtain a more accurate measurement of the intensity profile.

The techniques of the instant invention are suitable to be employed with various types of optical differential phase-shift keying (DPSK) signals, such as differential binary phase-shift keying (DBPSK) and differential quadrature phase-shift keying (DQPSK) signals. They may also be employed with amplitude-shift keying (ASK), combined DPSK/ASK, and quadrature amplitude modulation (QAM).

BRIEF DESCRIPTION OF THE DRAWING

In the drawing:

FIG. 11 shows high level block diagram of an arrangement suitable to be used to make up each of the processing units of FIG. 5 but which is arranged to treat the fiber as if it was made up of 2 segments each having DGD values each fixed to 0.4 $T_S$.

FIG. 12 shows an exemplary high level block diagram of an arrangement which is suitable to be used to make up each of the processing units of FIG. 5 but which is arranged for use with a coherent-detection receiver, in accordance with an aspect of the invention.

DETAILED DESCRIPTION

Figure 1:
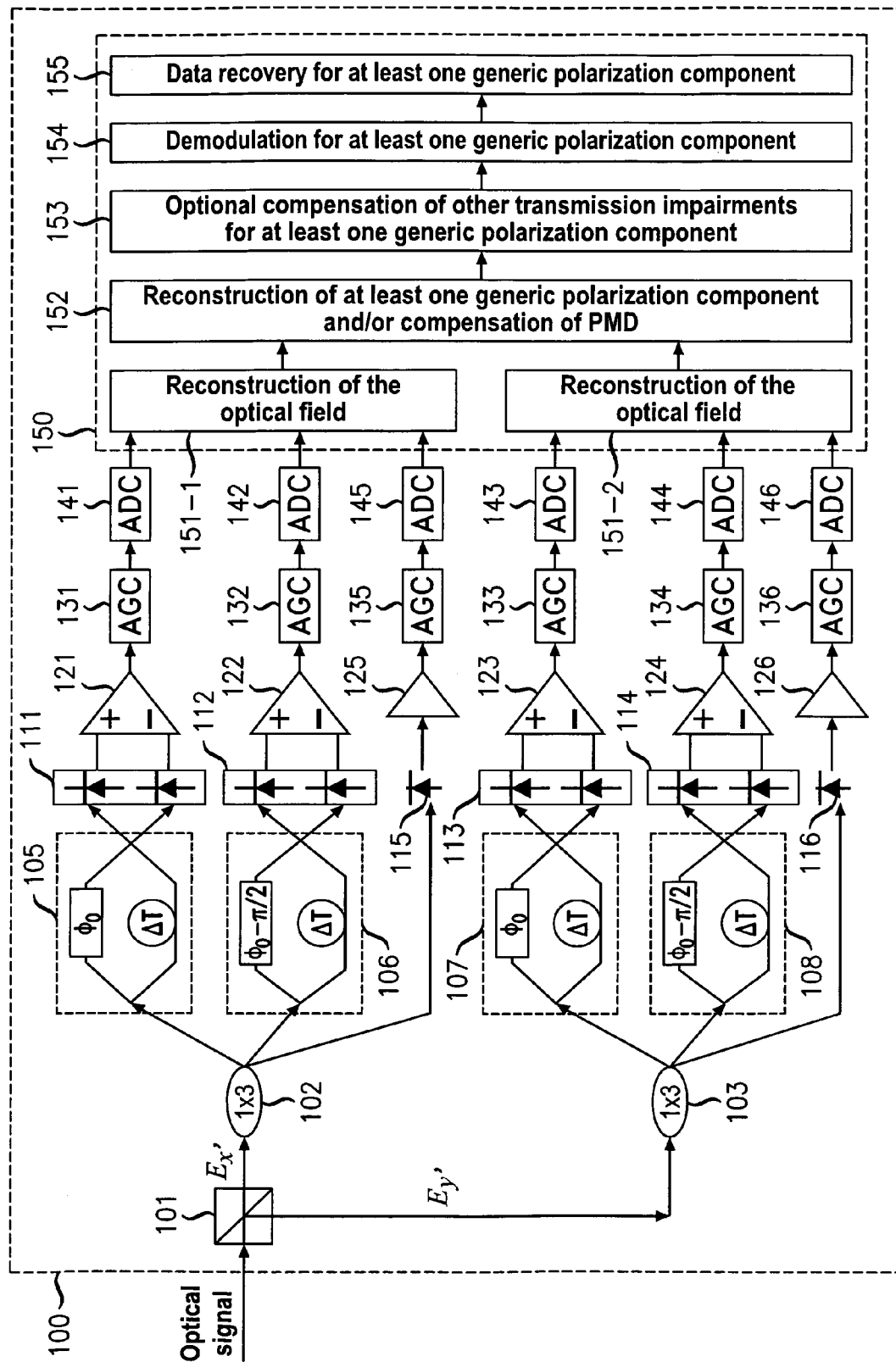
FIG. 1 shows an exemplary apparatus, typically in a receiver, arranged in accordance with the principles of the invention, for developing at least one so-called "generic" polarization component of a received optical signal.

The following merely illustrates the principles of the invention. It will thus be appreciated that those skilled in the art will be able to devise various arrangements that, although not explicitly described or shown herein, embody the principles of the invention and are included within its spirit and scope. Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the invention. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various elements shown in the FIGs., including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementor as more specifically understood from the context.

In the claims hereof any element expressed as a means for performing a specified function is intended to encompass any way of performing that function. This may include, for example, a) a combination of electrical or mechanical elements which performs that function or b) software in any form, including, therefore, firmware, microcode or the like, combined with appropriate circuitry for executing that software to perform the function, as well as mechanical elements coupled to software controlled circuitry, if any. The invention as defined by such claims resides in the fact that the functionalities provided by the various recited means are combined and brought together in the manner which the claims call for. Applicant thus regards any means which can provide those functionalities as equivalent as those shown herein.

Software modules, or simply modules which are implied to be software, may be represented herein as any combination of flowchart elements or other elements indicating performance of process steps and/or textual description. Such modules may be executed by hardware that is expressly or implicitly shown.

Unless otherwise explicitly specified herein, the drawings are not drawn to scale.

In the description, identically numbered components within different ones of the FIGs. refer to the same components.

FIG. 1 shows an exemplary apparatus, typically in a receiver, arranged in accordance with the principles of the invention, for developing at least one so-called "generic" polarization component of a received optical signal. This is achieved by developing an electronic version of the entire complex optical field of a received optical signal by employing direct differential detection in conjunction with digital signal processing. It is further possible to compensate for various impairments that were inflicted upon the optical signal as it traveled from its source. FIG. 1 shows a) polarization beam splitter (PBS) 101; b) 1×3 optical splitters 102 and 103; c) optical delay interferometers (ODIs) 105, 106, 107, and 108; d) balanced intensity detectors 111, 112, 113, and 114; e) single intensity detectors 115 and 116; f) optional amplifiers 121, 122, 123, 124, 125, and 126; g) optional automatic-gain controllers (AGCs) 131, 132, 133, 134, 135, and 136; h) analog-to-digital converters (ADCs) 141, 142, 143, 144, 145, and 146; and i) digital signal processing (DSP) unit 150.

More specifically, polarization beam splitter 101 separates the received optical signal to produce two orthogonal polarization components, $E_{x'}$ and $E_{y'}$, therefrom. $E_{x'}$ is supplied to 1×3 optical splitter 102 while $E_{y'}$ is supplied to 1×3 optical splitter 103. However, the orthogonal polarization components, $E_{x'}$ and $E_{y'}$, are highly unlikely to correspond to the polarization of the generic components that were originally transmitted as they are currently manifest in the received signal.

1×3 optical splitter 102 replicates the received optical signal so as to produce three copies. One of the three beams produced by 1×3 optical splitter 102 is supplied to optical delay interferometer (ODI) 105, another of the three beams produced by 1×3 optical splitter 102 is supplied to ODI 106, and the last beam is supplied to photodiode 115. The optical power allotted to each of the copies from the originally input optical signal is at the discretion of the implementer. In one embodiment of the invention, the power is divided up so that about between 40 to 45 percent of the input power is supplied as output to each of ODIs 105 and 106 and the remaining power, e.g., between 10 and 20 percent, is supplied to photodiode 115.

As will be readily recognized by those of ordinary skill in the art, optical delay interferometers (ODIs) 105, 106, 107 and 108 may be any type of interferometer having the required characteristics. For example, the ODIs may be based on the well-known, so-called Mach-Zehnder interferometer. Alternatively, the ODIs may be based on the well-known, so-called Michaelson interferometer. Preferably, ODIs 105 and 106 are made in a pair so that their phase orthogonality (or π/2 offset in their differential phases between interfering arms) is automatically guaranteed, e.g., using techniques such as disclosed in U.S. patent application Ser. No. 10/875,016 applied for on Jun. 23, 2004 by Christopher R. Doerr and Douglas M. Gill, entitled "Apparatus and Method for Receiving a Quadrature Differential Phase Shift Key Modulated Optical Pulsetrain" published as 2005/0286911 on Dec. 29, 2005 and U.S. patent application Ser. No. 11/163,190 applied for on Oct. 8, 2005 by Xiang Liu, entitled "Optical Demodulating Apparatus and Method" published as 2007/0081826 on Apr. 12, 2007. Further preferably, the two ODI pairs are either monolithically integrated on a same substrate so that their characteristic polarization orientations are the same. Note that the characteristic polarization orientations of an ODI is analogous to the PSP of a fiber.

Each of the ODIs 105 and 107 has a delay of about ΔT in the optical path between its respective two arms and a phase difference, i.e., offset, of $\phi_0$, where $$\Delta T = \frac{T_S}{sps}, \quad (1)$$

where $T_S$ is the symbol period of the signal, sps is the number of samples per symbol taken by the analog to digital converters and $\phi_0$ is an arbitrarily selected number, which is preferably set at $\pi/4$. If so, the free spectral range (FSR), i.e., $1/\Delta T$, of the ODIs is related to the signal symbol rate (SR) as FSR=SR·sps. Note that, based on numerical simulations, it has been found that, preferably, sps be set to a value of 4. This is because an sps value of less than 4 tends to not be sufficient to accurately represent the signal waveform sufficiently given the procedures described hereinbelow, while sps greater than 4 provides only negligible improvement.

The delay difference may be achieved, in one embodiment of the invention, by adjusting one arm of the interferometer to have a gross length difference of $\Delta T*C/n$, where C is the speed of light in vacuum and n is the index of refraction of the medium of the arm, and then adjusting the length further to cause a phase shift of $\phi_0$. Note that in practice, because a phase shift of $\phi_0$ corresponds to a very small length difference, the phase shift portion may actually be somewhat longer or shorter, so that the total length is $\phi_0$ plus or minus a multiple of $2\pi$. That way, even thought the length is not precisely $\phi_0$, the phase change is effectively $\phi_0$.

The total length change used to achieve the effective length change of $\phi_0$ may be some percentage of the length $\Delta T \cdot C/n$. While even up to 25 percent can work, preferably, the percentage is less than 10 percent, and of course, the more accurate the length can be made to match the actual desired length the better the performance will be. In other embodiments of the invention, the delay required may be divided between the arms, so long as the required delay and phase difference is achieved. Those of ordinary skill in the art will readily recognize how to develop an appropriate arrangement to implement ODIs 105 and 107.

While any value may be employed as the value of phase offset $\phi_0$, for compatibility with conventional receivers, as will be seen hereinbelow, certain values of $\phi_0$ may be advantageously employed. For example, a good value of $\phi_0$ is $\pi/4$ for DQPSK and 0 for DBPSK.

Each of ODIs 106 and 108 are similar to ODIs 105 and 107, in that each has delay of about $\Delta T$ in the optical path between their respective two arms, but between their arms they each have a phase offset of $\phi_0 - \pi/2$. Thus, the difference between the phase offsets of ODIs 105 and 106 is $\pi/2$, so ODIs 105 and 106 are said to have orthogonal phase offsets. Similarly, the difference between the phase offsets of ODIs 107 and 108 is $\pi/2$, so ODIs 107 and 108 are said to have orthogonal phase offsets.

Together, ODI 105 and 106 make up a so-called "I/Q ODI pair". The four outputs of I/Q ODI pair made up of ODIs 105 and 106 are then detected by two balanced detectors 111 and 112, respectively, in the manner shown in FIG. 1. The outputs of balanced detectors 111 and 112 are amplified by a respective one of amplifiers 121 and 122, and they may then be normalized by one of optional automatic-gain controllers (AGCs) 131 and 132.

Balanced intensity detectors 111 and 112 are conventional. Typically, each of balanced intensity detectors 111 and 112 is made up of a pair of well-matched photodiodes. Balanced intensity detectors 111 and 112 convert the output of each of the arms of ODIs 105 and 106 to an electrical representation. Thus, balanced intensity detectors 111 and 112 obtain an electrical version of the real and imaginary parts of the complex waveform that contains the information about the phase differences between two time locations separated by $\Delta T$ in the polarization component of the received optical signal supplied from PBS 101 to 1×3 optical splitter 102.

Photodiode 115 performs conventional direct intensity detection, and thus obtains the intensity profile of $E_{x'}$ in electronic form.

Amplifiers 121, 122, and 125 amplify the signals supplied as outputs by balanced intensity detector 111, balanced intensity detector 112, and photodiode 115, respectively. Typically, amplifiers 121, 122, and 125 convert the current which is output by the various photodiodes of balanced intensity detector 111, balanced intensity detector 112, and photodiode 115 to respective corresponding voltages. To this end, amplifiers 121, 122, and 125 may be trans-impedance amplifiers. Furthermore, amplifiers 121 and 122 may be differential amplifiers. After amplification, each of the outputs is typically single ended. Optional automatic-gain controllers (AGCs) 131, 132, and 135 may be employed to normalize the electronic waveforms prior to digitization.

Analog-to-digital converters (ADCs) 141, 142, and 143 perform "digital sampling" of the amplified signals to develop a digital representation of the amplified signals. ADCs 141, 142, and 145 typically have the same resolution, e.g., 8 bits.

1×3 optical splitter 103, similar to 1×3 optical splitter 102, replicates the received optical signal so as to produce three copies. One of the three beams produced by 1×3 optical splitter 103 is supplied to optical delay interferometer (ODI) 107, another of the three beams produced by 1×3 optical splitter 103 is supplied to ODI 108, and the last beam is supplied to photodiode 116.

Together, ODIs 107 and 108 make up an I/Q ODI pair. The four outputs of I/Q ODI pair made up of ODIs 107 and 108 are then detected by two balanced detectors 113 and 114, respectively, in the manner shown in FIG. 1. The outputs of balanced detectors 113 and 114 are amplified by a respective one of amplifiers 123 and 124, and they may then be normalized by one of optional automatic-gain controllers (AGCs) 133 and 134.

Balanced intensity detectors 113 and 114 are conventional. Typically, each of balanced intensity detectors 113 and 114 is made up of a pair of well-matched photodiodes. Balanced intensity detectors 113 and 114 convert the output of each of the arms of ODIs 107 and 108 to an electrical representation. Thus, balanced intensity detectors 113 and 114 obtain an electrical version of the real and imaginary parts of the complex waveform that contains the information about the phase differences between two time locations separated by $\Delta T$ in the polarization component of the received optical signal supplied from PBS 101 to 1×3 optical splitters 103.

Photodiode 116 performs conventional direct intensity detection, and thus obtains the intensity profile of $E_{y'}$ in electronic form.

Amplifiers 123, 124, and 126 amplify the signals supplied as outputs by balanced intensity detector 113, balanced intensity detector 114, and photodiode 116, respectively. Typically, amplifiers 123, 124, and 126 convert the current which is output by the various photodiodes of balanced intensity detector 113, balanced intensity detector 114, and photodiode 116 to respective corresponding voltages. To this end, amplifiers 123, 124, and 126 may be trans-impedance amplifiers. Furthermore, amplifiers 123 and 124 may be differential amplifiers. After amplification, each of the outputs is typically single ended. Optional automatic-gain controllers (AGCs) 133, 134, and 136 may be employed to normalize the electronic waveforms prior to digitization.

Analog-to-digital converters (ADCs) 143, 144, and 146 perform "digital sampling" of the amplified signals to develop a digital representation of the amplified signals. ADCs 143, 144, and 146 typically have the same resolution, e.g., 8 bits.

Digital signal processing unit 150 receives the digital representation of all of the digitized signals supplied from ADCs 141-146 and develops at least one so-called "generic" polarization component of the received optical. Note that by a generic polarization component it is generally intended the original signal that corresponds to the received signal at the point at which the modulation of that polarization component for transmission is completed.

In accordance with an aspect of the invention, reconstruction unit 151-1 receives the digitized signals supplied from ADCs 141, 142, and 145 and develops a digital representation of the amplitude and phase profiles of one of the polarizations of the received optical signal, e.g., x'. Similarly, in accordance with an aspect of the invention, reconstruction unit 151-2 receives the digitized signals supplied from ADCs 143, 144, and 146 and develops a digital representation of the received optical signal field, i.e., the amplitude and phase profiles, of one of the other polarization of the received optical signal, e.g., y'. To this end, reconstruction unit 151-1 treats its inputs as if they were the entirety of the optical signal and processes those inputs according to Liu-Wei, e.g., using m=1, prior to any compensation for distortions, e.g., according to the processing described in Liu-Wei in connection with reconstruction unit 151 thereof. The resulting output for this reconstruction, referred to in Liu-Wei as $E_R(t_s)$, is referred to herein as $E_{x'}(t)$. Similarly, reconstruction unit 151-2 treats its inputs as if they were the entirety of the optical signal and processes those inputs according to according to Liu-Wei, e.g., using m=1, prior to any compensation for distortions, e.g., according to the processing described in Liu-Wei in connection with reconstruction unit 151 thereof, to develop received optical signal field, i.e., the amplitude and phase profiles. The resulting output for this reconstruction, referred to in Liu-Wei as $E_R(t_s)$, is referred to herein as $E_{y'}(t)$.

Due to fiber birefringence or PMD, the two orthogonal polarization components of the optical signal as received at the receiver after fiber transmission are generally not the generic polarization components of the signal. Therefore, in accordance with an aspect of the invention, the reconstructed digital versions of the complex field of each of the two orthogonal polarization components of the optical signal as received at the receiver $E_{x'}(t)$ and $E_{y'}(t)$ need to be further processed jointly to develop at least one "generic" polarization component of the received optical, as to be described below.

Figure 4:
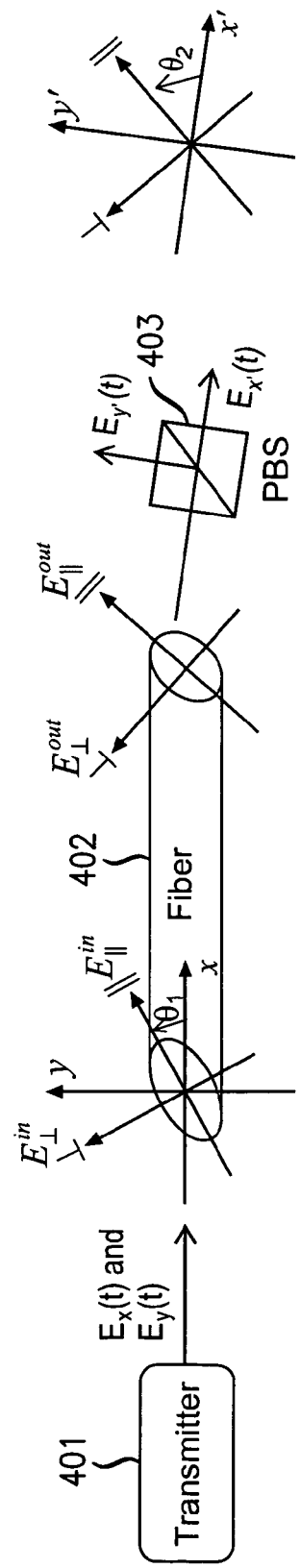
FIG. 4 shows an exemplary polarization "evolution" as an optical signal passes over a typical fiber transmission link that causes PMD.

FIG. 4 shows an exemplary polarization "evolution" as an optical signal passes over a typical fiber transmission link 402 that causes PMD. The two polarization components of the signal after fiber transmission along the two PSP axes of the fiber, defined hereafter as $E_\parallel^{out}$ and $E_\perp^{out}$—treating the fiber as a single DGD element that introduces a certain DGD between the two axes—can be linked to the two orthogonal components of the received signal field $E_{x'}$ and $E_{y'}$ as follows, $$\begin{bmatrix} E_\parallel^{out}(t) \\ E_\perp^{out}(t) \end{bmatrix} = \begin{bmatrix} \cos(\theta_2) & \sin(\theta_2) \\ -\sin(\theta_2) & \cos(\theta_2) \end{bmatrix} \cdot \begin{bmatrix} E_{x'}(t) \\ E_{y'}(t) \cdot e^{j \cdot \delta\phi_2} \end{bmatrix} \quad (2)$$

$$= \begin{bmatrix} \cos(\theta_2) E_{x'}(t) + \sin(\theta_2) E_{y'}(t) \cdot e^{j \cdot \delta\phi_2} \\ -\sin(\theta_2) E_{x'}(t) + \cos(\theta_2) E_{y'}(t) \cdot e^{j \cdot \delta\phi_2} \end{bmatrix},$$

where $\theta_2$ is the angle between the two characteristic orientations of PBS 101 and the two PSP axes of fiber 402, and $\delta\phi_2$ is the additional phase difference between the two reconstructed signal fields $E_{x'}$ and $E_{y'}$ as compared to the phase difference of the two received polarization components right after PBS 403. The additional phase difference includes an initially unknown relative phase difference between the two reference points used in the two reconstructed optical fields. In accordance with an aspect of the invention, during the joint processing the phase difference $\delta\phi_2$ is determined by employing a searching technique, such as is described hereinbelow. $E_{x'}$ and $E_{y'}$ are the reconstructed optical fields of the two orthogonal polarization components of the received optical signal as separated by polarization beam splitter 403.

The two polarization components of the signal along the two PSP axes of fiber 402 at the input of fiber 402, defined hereafter as $E_\parallel^{in}$ and $E_\perp^{in}$, can be related to $E_\parallel^{out}$ and $E_\perp^{out}$ as $$E_\parallel^{in}(t) = E_\parallel^{out}(t - \tau_{DGD}) \cdot e^{j \cdot \delta\phi},$$

$$E_\perp^{in}(t) = E_\perp^{out}(t), \quad (3)$$

where $\tau_{DGD}$ is the PMD-induced DGD, and $\delta\phi$ is the PMD-induced or birefringence-induced phase difference between the two PSPs, which may be time varying, e.g., due to environmental, e.g., mechanical or temperature changes. Conventionally, the $\parallel$ and $\perp$ axes are called the fast PMD axis and the slow PMD axis, respectively. In the case that PMD is sufficiently small, $\tau_{DGD}$ can be approximated as 0 in Eq. (3), but the PMD-induced or birefringence-induced phase difference $\delta\phi$ cannot be neglected.

When the original signal emitted from transmitter 401 is polarization multiplexed to carry two generic polarization components, $E_x$ and $E_y$, the two generic components can be linked to $E_\parallel^{in}$ and $E_\perp^{in}$ as $$\begin{bmatrix} E_x(t) \\ E_y(t) \end{bmatrix} = \begin{bmatrix} \cos(\theta_1) & -\sin(\theta_1) \\ \sin(\theta_1) & \cos(\theta_1) \end{bmatrix} \cdot \begin{bmatrix} E_\parallel^{in}(t) \\ E_\perp^{in}(t) \end{bmatrix}, \quad (4)$$

where $\theta_1$ is the angle between the two orthogonal polarization components of the original signal from the transmitter and the two PSP axes of the fiber at its input.

Combing equations (2), (3), and (4), two generic polarization components, $E_x$ and $E_y$, can then be expressed in terms of the received polarization components as $$\begin{bmatrix} E_x(t) \\ E_y(t) \end{bmatrix} = \begin{bmatrix} \cos(\theta_1) & -\sin(\theta_1) \\ \sin(\theta_1) & \cos(\theta_1) \end{bmatrix} \cdot \begin{bmatrix} E_\parallel^{in}(t) \\ E_\perp^{in}(t) \end{bmatrix} \quad (5)$$

$$= \begin{bmatrix} \cos(\theta_1) & -\sin(\theta_1) \\ \sin(\theta_1) & \cos(\theta_1) \end{bmatrix} \cdot \begin{bmatrix} E_\parallel^{out}(t - \tau_{DGD}) \cdot e^{j \cdot \delta\phi} \\ E_\perp^{out}(t) \end{bmatrix}$$

$$= \begin{bmatrix} \cos(\theta_1) E_\parallel^{out}(t - \tau_{DGD}) \cdot e^{j \cdot \delta\phi} - \sin(\theta_1) E_\perp^{out}(t) \\ \sin(\theta_1) E_\parallel^{out}(t - \tau_{DGD}) \cdot e^{j \cdot \delta\phi} + \cos(\theta_1) E_\perp^{out}(t) \end{bmatrix}$$

$$= \begin{bmatrix} \cos(\theta_1)[\cos(\theta_2) E_{x'}(t - \tau_{DGD}) + \sin(\theta_2) E_{y'}(t - \tau_{DGD}) \cdot e^{j \cdot \delta\phi_2}] e^{j \cdot \delta\phi} - \sin(\theta_1)[-\sin(\theta_2) E_{x'}(t) + \cos(\theta_2) E_{y'}(t) e^{j \cdot \delta\phi_2}] \\ \sin(\theta_1)[\cos(\theta_2) E_{x'}(t - \tau_{DGD}) + \sin(\theta_2) E_{y'}(t - \tau_{DGD}) \cdot e^{j \cdot \delta\phi_2}] e^{j \cdot \delta\phi} + \cos(\theta_1)[-\sin(\theta_2) E_{x'}(t) + \cos(\theta_2) E_{y'}(t) e^{j \cdot \delta\phi_2}] \end{bmatrix}.$$

In the case that the original signal is singly polarized, i.e., it has only one generic polarization component at the transmitter, e.g., $E_x$, only half of the computation in Eq. (5) is needed.

As shown in Eq. (5), five parameters, $\theta_1$, $\theta_2$, $\delta\phi$, $\delta\phi_2$, and $\tau_{DGD}$, are generally needed to recover the original optical signal field, which can be either single polarized or polarization multiplexed. When PMD is sufficiently small, e.g., the PMD induced DGD is much smaller than the signal symbol period, $\tau_{DGD}$ may be safely set to zero in deriving the original signal field, leaving four parameters, $\theta_1$, $\theta_2$, $\delta\phi$, and $\delta\phi_2$, to be determined. Since these parameters are generally time varying, it is needed to find the values of these parameters dynamically.

Figure 5:
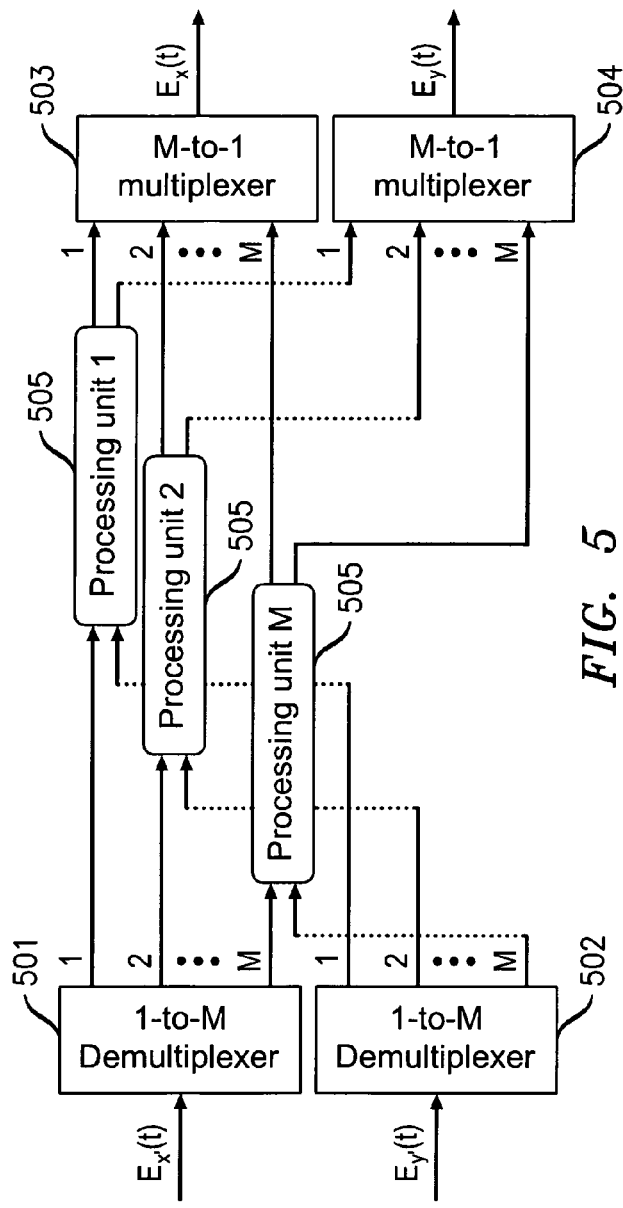
FIG. 5 shows an exemplary arrangement to perform the digital signal processing needed to recover the generic polarization components from the reconstructed optical fields of the two orthogonal polarization components of the received optical signal, in accordance with an aspect of the invention.

The digital signal processing needed to recover the generic polarization components from the reconstructed optical fields of the two orthogonal polarization components of the received optical signal can be performed on a block by block basis, with each block having multiple samples. FIG. 5 shows an exemplary arrangement to perform the digital signal processing needed to recover the generic polarization components from the reconstructed optical fields of the two orthogonal polarization components of the received optical signal, in accordance with an aspect of the invention. This circuit consists of demultiplexers 501 and 502, M processing units (PUs) 505, and multiplexers 503 and 504.

The inputs to the arrangement of FIG. 5 are $E_{x'}(t)$ and $E_{y'}(t)$ and the outputs therefrom are $E_x(t)$ and $E_y(t)$. Each of demultiplexers 501 and 502 divides the samples it receives over M parallel paths, thereby reducing the processing speed requirement of Pus 505. Eventually multiplexers 503 and 504 multiplex the processed samples to construct $E_x(t)$ and $E_y(t)$. Note that at any given time, the blocks of samples supplied to one of PUs 505 may have samples overlapping with those of its adjacent PUs. Note also that the multiplexers and demultiplexers can be shared with the field reconstruction process, e.g., as described in Liu-Wei.

Figure 6:
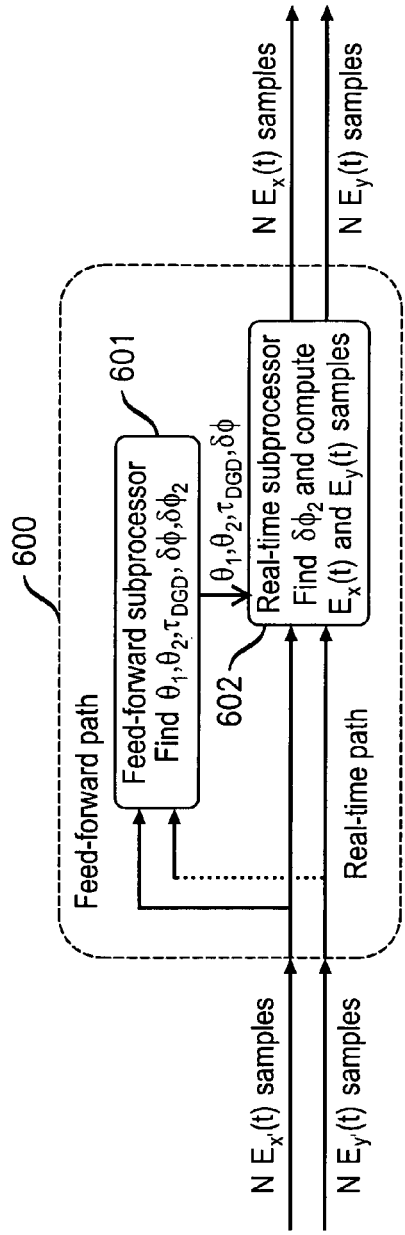
FIG. 6 shows an exemplary high level block diagram of an arrangement which is suitable to be used to make up each of the processing units of FIG. 5.

FIG. 6 shows an exemplary high level block diagram of arrangement 600 which is suitable to be used to make up each of PUs 505. Arrangement 600, when employed as a PU 505, receives at one time, for each time period, two corresponding blocks of samples, each block being of length N. N is typically greater than 4 and less than 40, with a suitable value being about 10. The value selected for N represents a tradeoff between accuracy achievable and the speed of computation needed to process the samples. The received samples are supplied to feed-forward subprocessor 601 and real-time subprocessor 602. Feed-forward subprocessor 601 finds the best guesses of the parameters needed to recover $E_x(t)$ and $E_y(t)$, and feeds these parameters, except for $\delta\phi_2$, to real-time subprocessor 602. Real-time subprocessor 602 receives N pairs of $E_{x'}(t)$ and $E_{y'}(t)$ samples, as well as the best guesses of parameters $\theta_1$, $\theta_2$, $\delta\phi$, and $\tau_{DGD}$, which were determined by feed-forward path 601, and supplies as an output the N pairs of $E_x(t)$ and $E_y(t)$ samples after processing the received inputs as described hereinbelow.

Figure 7:
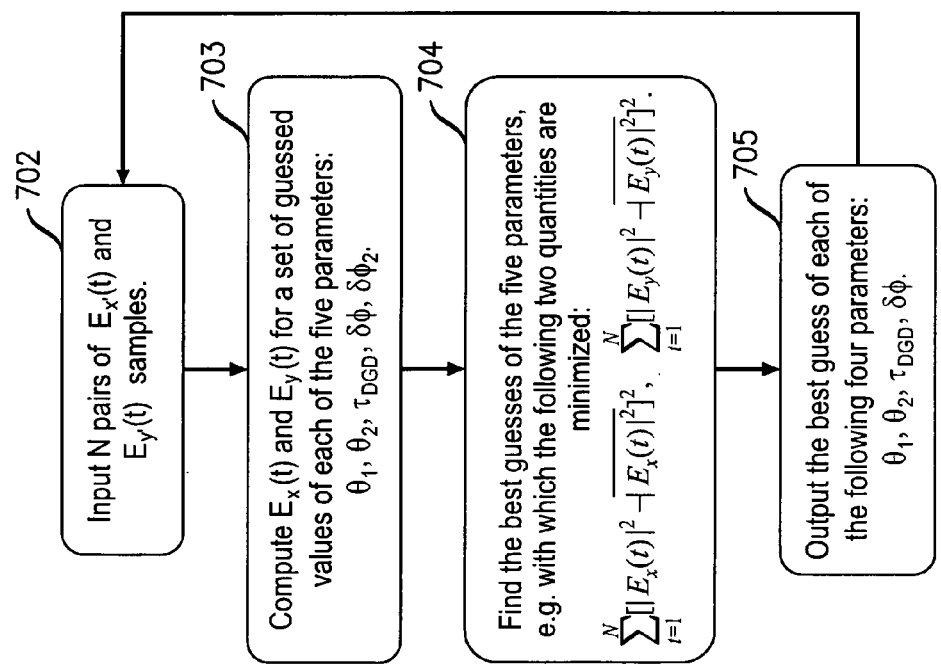
FIG. 7 shows an exemplary process expressed in flow-chart form for finding the best guesses of the parameters needed to recover $E_x(t)$ and $E_y(t)$, in accordance with an aspect of the invention.

FIG. 7 shows an exemplary process expressed in flow-chart form for finding the best guesses of the parameters needed to recover $E_x(t)$ and $E_y(t)$, in accordance with an aspect of the invention. This process may be performed in feed-forward subprocessor 601. The process begins in step 702, when N pairs of $E_{x'}(t)$ and $E_{y'}(t)$ samples are received. Next, in step 703, using Eq. (5), candidate values of $E_x(t)$ and $E_y(t)$ are calculated for each of the received N pairs of $E_{x'}(t)$ and $E_{y'}(t)$ samples. To do so, for each $E_x(t)$ and $E_y(t)$ pair, a candidate value is calculated for each possible combination of values for each of the five parameters over their respective physically allowable ranges. For example, the physically allowable ranges may be $\theta_1 \in [0,\pi)$, $\theta_2 \in [0,\pi)$, $\delta\phi \in [0,2\pi)$, and $\delta\phi_2 \in [0,2\pi)$. For $\tau_{DGD}$ the range employed may be from 0 to the symbol period of the signal, although it is recognized that $\tau_{DGD}$ may actually be larger.

Preferably, this is performed by selecting a combination of values for each of the five parameters and using them to compute N candidate values of $E_x(t)$ and $E_y(t)$. In one embodiment of the invention, the guess values for each of the parameters are uniformly distributed over within its allowed range. Typically, 10 to 20 guess values for each parameter should be sufficient.

One way to perform the calculation is to implement double loop, where the outer loop is the parameter values and the inner loop is the N sample pairs. A loop so arranged facilitates the computation of step 704, in which the particular values of the five parameters that minimizes a variance-type quantity of the N candidate $E_x(t)$ and $E_y(t)$ is selected. For example, the values of the five parameters that minimizes the variance of a candidate set of $$E_x(t), \text{ i.e., } \sum_{t=1}^{N}\left[|E_x(t)|^2 - \overline{|E_x(t)|^2}\right]^2$$

is selected as the best guess. Alternatively, the values of the five parameters that minimizes the variance of a candidate set of $$E_y(t), \text{ i.e., } \sum_{t=1}^{N}\left[|E_y(t)|^2 - \overline{|E_y(t)|^2}\right]^2$$

is selected as the best guess. Alternatively, some combination of the two variances may be specified as variance-type quantity to be minimized.

The forgoing selection of the generic polarization components of the signal, i.e., $E_x(t)$ and $E_y(t,)$ assumes that as originally transmitted the generic polarization components intrinsically had a constant intensity, i.e., amplitude, which is generally the case for DPSK-type formats, which include at least DBPSK and DQPSK. Alternatively, the best guesses of these parameters may be found using approaches similar to or based on the constant modulus algorithm (CMA).

In step 705, the best guesses for the four parameters $\theta_1$, $\theta_2$, $\delta\phi$, and $\tau_{DGD}$ are supplied as an output, and control passes back to step 702 to process the next N pairs of $E_{x'}(t)$ and $E_{y'}(t)$ samples. Note that the values of the four parameters $\theta_1$, $\theta_2$, $\delta\phi$, and $\tau_{DGD}$ typically tend to change at a rate that is much slower than the signal symbol rate. Thus, feed-forward subprocessor 601 need not process all of the blocks of N pairs of $E_{x'}(t)$ and $E_{y'}(t)$ samples that it receives, since doing so will yield essentially the same values for those periods of time over which the parameters remain substantially unchanged. For example, the rate of fiber PMD change is usually slower than 10 KHz, which is $10^6$ times slower than the symbol rate of a 10-Gbaud signal. Advantageously, this significantly relaxes the computation speed required feed-forward subprocessor 601. Of course, should there be a situation in which the rate of change of the values of four parameters $\theta_1$, $\theta_2$, $\delta\phi$, and $\tau_{DGD}$ is more rapid, they may be computed more often, or even for every block.

In another embodiment of the invention, rather than use 10 to 20 guesses for each of the slow varying parameters, $\theta_1$, $\theta_2$, $\delta\phi$, and $\tau_{DGD}$ only three guess values are employed for each parameter, one being the previous best guess value and the other two being its nearest neighboring guess values. For the angular parameters, the nearest neighbor guess values should be the cyclic neighbors, by which it is generally meant taking modulus with respect to the appropriate value, e.g., $2\pi$ for $\delta\phi$ and $\pi$ for $\theta_1$ and $\theta_2$. The cyclic spacing between the two nearest neighboring guess values should be much smaller than the allowable range of the parameter. Preferably, the spacing is at least 10 times smaller than the allowable range of the parameter. For $\tau_{DGD}$ the nearest neighbors are those values that are one minimum step up and one minimum step down, each step being substantially smaller than the symbol period. Preferably, the spacing is at least 5 times smaller than the allowable range of the parameter. Doing so advantageously reduces the amount of computation that is required.

In yet another embodiment of the invention, the guess value for $\tau_{DGD}$ does not need to be searched. Rather, the guess value for $\tau_{DGD}$ can be fixed to a fraction of the symbol period, e.g., $0.4\ T_S$, and useful PMD compensation still results.

Figure 8:
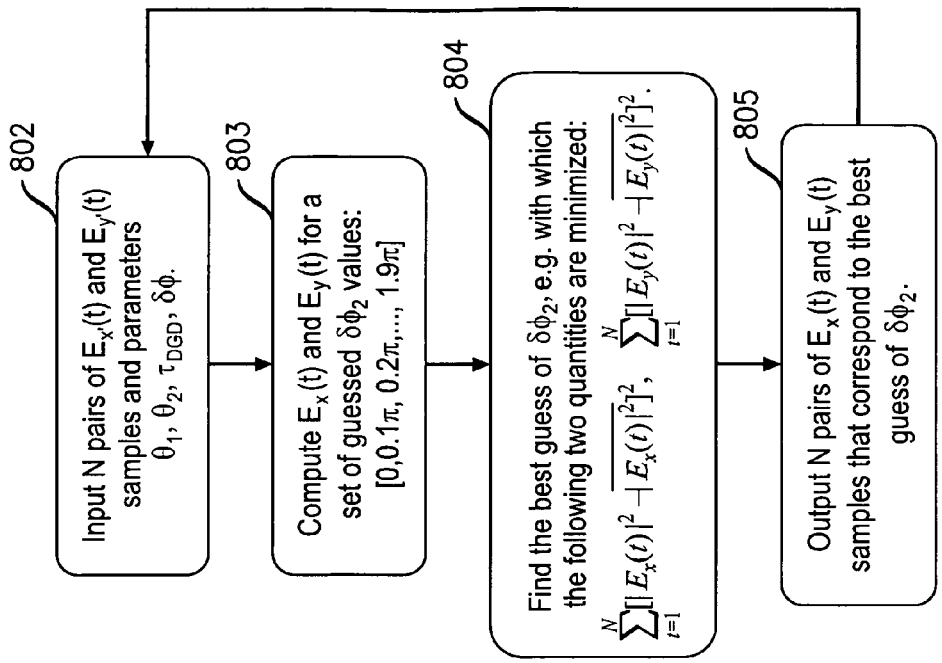
FIG. 8 shows an exemplary process, expressed in flow-chart form, which is performed by the real-time subprocessor 602 of FIG. 6 in one embodiment of the invention.

FIG. 8 shows an exemplary process, expressed in flowchart form, which is performed by real-time subprocessor 602 in one embodiment of the invention. In step 802, N pairs of $E_x(t)$ and $E_y(t)$ samples, as well as the best guesses of parameters $\theta_1$, $\theta_2$, $\delta\phi$, and $\tau_{DGD}$ obtained by feed-forward subprocessor 601, are received. Next, step 803 computes $E_x(t)$ and $E_y(t)$ for a set of guess values of $\delta\phi_2 \in [0, 2\pi)$ using Eq. (5).

Thereafter, in step 804, the best guess of $\delta\phi_2$ is found. In one embodiment of the invention, the best guess is the guess by which at least one of the variance of the N quantities that represents $$E_x(t), \text{ i.e., } \sum_{t=1}^{N}\left[|E_x(t)|^2 - \overline{|E_x(t)|^2}\right]^2,$$

and that represents $E_y(t)$, i.e., $$E_y(t), \text{ i.e., } \sum_{t=1}^{N}\left[|E_y(t)|^2 - \overline{|E_y(t)|^2}\right]^2,$$

is minimized. Note that typically minimizing one of variance of the N quantities that represents $E_x(t)$ and variance of the N quantities that represents $E_y(t)$ results in the other also being minimized. However, this is not always so, e.g., in the presence of noise, and the implementer may instead choose to minimize the difference between the variance of the N quantities that represents $E_x(t)$ and the variance of the N quantities that represents $E_y(t)$.

In step 805 the N pairs of $E_x(t)$ and $E_y(t)$ samples that correspond to the best guess of $\delta\phi_2$ are supplied as outputs and control passes back to step 802 to process the next N pairs of $E_x(t)$ and $E_y(t)$ samples.

Figure 9:
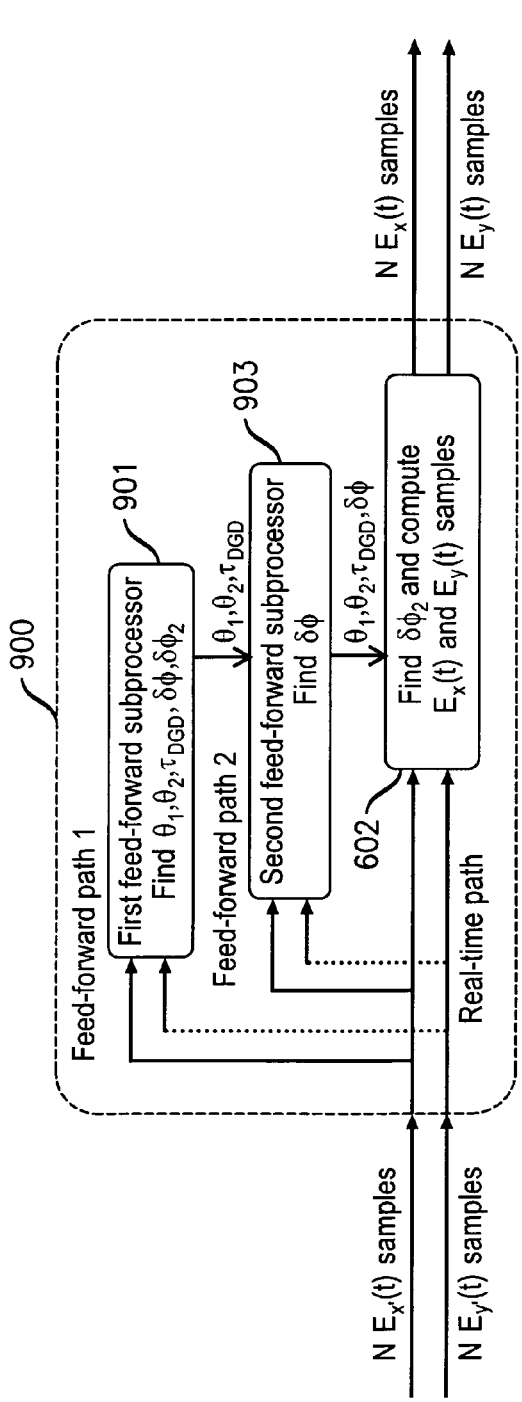
FIG. 9 shows an exemplary high level block diagram arrangement that is suitable to be used to make up each of the processing units of FIG. 5 but which is arranged to speed up the processing as compared to the arrangement shown in FIG. 6.

FIG. 9 shows an exemplary high level block diagram arrangement 900 that is suitable to be used to make up each of PUs 505 but which is arranged to speed up the processing as compared to the arrangement shown in FIG. 6. The arrangement of FIG. 9 takes into consideration the fact that parameters $\theta_1$, $\theta_2$, and $\tau_{DGD}$ typically change much more slowly than $\delta\phi$ changes, and therefore they may to be computed at a slower rate. To this end feed-forward subprocessor 601 of FIG. 6 is further split into first feed-forward subprocessor 901, which computes at a slower rate as compared to feed-forward subprocessor 601 of FIG. 6, and second feed-forward subprocessor 903, which computes at the same rate as did feed-forward subprocessor 601 of FIG. 6.

First feed-forward subprocessor 901 receives as input N pairs of $E_x(t)$ and $E_y(t)$ samples and supplies as outputs the best guesses of parameters $\theta_1$, $\theta_2$, and $\tau_{DGD}$. Second feed-forward subprocessor 903 likewise receives as input N pairs of $E_x(t)$ and $E_y(t)$ samples and it also receives as input the best guesses of $\theta_1$, $\theta_2$, and $\tau_{DGD}$ which are supplied as outputs by first feed-forward subprocessor 901. Second feed-forward subprocessor 903 supplies the best guess value of $\delta\phi$ as an output to real-time subprocessor 602 and it also passes on the best guesses of $\theta_1$, $\theta_2$, and $\tau_{DGD}$. Note that, alternatively, the best guesses of $\theta_1$, $\theta_2$, and $\tau_{DGD}$ could be supplied directly from first feed-forward subprocessor 901 to real-time subprocessor 602. Advantageously, since the update rate of first feed-forward subprocessor 901 can be much slower than that of second feed-forward subprocessor 903, the computational speed requirement of the feed-forward path is reduced overall.

Real-time subprocessor 602 receives the same N pairs of $E_x(t)$ and $E_y(t)$ samples and the best guesses of parameters $\theta_1$, $\theta_2$, $\delta\phi$, and $\tau_{DGD}$ as it did in FIG. 6, albeit from second feed-forward subprocessor 903 rather than feed-forward subprocessor 601, and outputs the N pairs of $E_x(t)$ and $E_y(t)$ samples based on the signal processing as described hereinabove.

The effectiveness of the electronic PMD compensation (PMDC) described hereinabove can be further improved by treating the fiber as if it was made up of multiple segments, each of which has its own "virtual" DGD parameters. More specifically, instead of the three parameters $\theta_1$, $\delta\phi$, and $\tau_{DGD}$ previously used to describe the fiber-induced PMD, one can treat the fiber link as a concatenation of M PMD segments, i.e., mini fibers, each described by three parameters, $\theta_1^i$, $\delta\phi^i$, and $\tau_{DGD}^i$ where $i=1, 2, \ldots M$ is the index of the virtual PMD segment. The two received polarization components can be generally linked to the generic polarization components, $E_x$ and $E_y$, as $$\begin{bmatrix} E_{x'} \\ E_{y'} \end{bmatrix} = T \cdot \begin{bmatrix} E_x \\ E_y \end{bmatrix} = P \cdot R_2 \cdot \prod_{i=1}^{M} PMD^{M-i+1} \cdot \begin{bmatrix} E_x \\ E_y \end{bmatrix}, \tag{6}$$

where matrix T represents the polarization transformation of the fiber link, $R_2$ is the rotation matrix associated with the projection of the signal components along the fiber PMD PSP axes at the fiber output on the polarization axes of the PBS used in the receiver, $PMD^i$ is the matrix describing the PMD effect of the i-th segment, and P is a phase-delay matrix representing the additional phase delay between the two reconstructed fields after the polarization beam splitting at the receiver.

Using the notations shown in FIG. 4, the rotation matrix $R_2$ can be written as $$R_2 = \begin{bmatrix} \cos(\theta_2) & -\sin(\theta_2) \\ \sin(\theta_2) & \cos(\theta_2) \end{bmatrix}. \tag{7}$$

The phase-delay matrix P can be written as $$P = \begin{bmatrix} 1 & 0 \\ 0 & e^{j\delta\phi_2} \end{bmatrix}. \quad (8)$$

The PMD matrix of the i-th segment, $PMD^i$, can be written in the frequency domain, e.g., after a Fourier transform from the time domain, as $$PMD^i(\Delta f) = \begin{bmatrix} 1 & 0 \\ 0 & e^{j(2\pi\cdot\Delta f\cdot\tau^i_{DGD}+\delta\phi^i)} \end{bmatrix} \cdot \begin{bmatrix} \cos(\theta_1^i) & \sin(\theta_1^i) \\ -\sin(\theta_1^i) & \cos(\theta_1^i) \end{bmatrix}, \quad (9)$$

where $\tau_{DGD}^i$ and $\delta\phi^i$ are, respectively, the differential group-delay (DGD) and the phase delay between the two PSP axes of the i-th PMD segment, $\theta_1^i$ is the angle between the orientation of the signal polarization at the input of the i-th PMD segment and one of its PSP axes, and $\Delta f$ is the frequency offset from the center frequency of the signal. In the time domain, the PMD matrix acts on an input signal as follows, $$PMD^i \cdot \begin{bmatrix} E_x^{i-1}(t) \\ E_y^{i-1}(t) \end{bmatrix} = \begin{bmatrix} \cos(\theta_1^i)E_x^{i-1}(t) + \sin(\theta_1^i)E_y^{i-1}(t) \\ [-\sin(\theta_1^i)E_x^{i-1}(t-\tau_{DGD}^i) + \cos(\theta_1^i)E_y^{i-1}(t-\tau_{DGD}^i)]e^{j\delta\phi^i} \end{bmatrix}, \quad (10)$$

where $E_x^{i-1}$ and $E_y^{i-1}$ are the two orthogonal signal polarization components along the two PSP axes of PMD segment i−1 its output when $i \geq 2$, or the generic signal polarization components, $E_x$ and $E_y$, when i=1. In principle, when the polarization transformation matrix T is known, the generic signal polarization components can then be derived from the reconstructed polarization components using $$\begin{bmatrix} E_x \\ E_y \end{bmatrix} = T^{-1} \cdot \begin{bmatrix} E_{x'}(t) \\ E_{y'}(t) \end{bmatrix} = \prod_{i=1}^{M}(PMD^j)^{-1} \cdot R_2^{-1} \cdot P^{-1} \begin{bmatrix} E_{x'} \\ E_{y'} \end{bmatrix}, \quad (11)$$

where −1 indicates the standard matrix inverse operation, i.e., the product of a matrix and its inverse is the identity matrix I.

Figure 10:
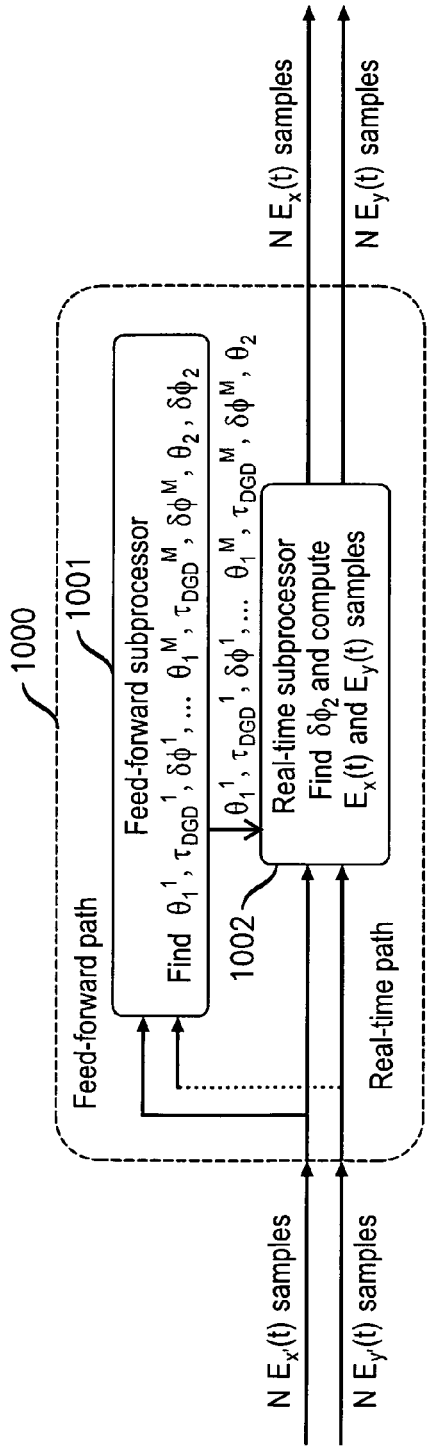
FIG. 10 shows exemplary high level block diagram of an arrangement suitable to be used to make up each of the processing units of FIG. 5 but which is arranged to treat the fiber as if it was made up of multiple segments, so as to achieve better compensation for PMD, including higher order PMD, than can be achieved than using the arrangements of FIG. 6 or 9.

FIG. 10 shows exemplary high level block diagram of arrangement 1000 suitable to be used to make up each of PUs 505 but which is arranged to treat the fiber as if it was made up of multiple segments, so as to achieve better compensation for PMD, including higher order PMD, than can be achieved than using the arrangements of FIG. 6 or 9. The process for performing such electronic PMDC assumes that the fiber was made up of M "virtual" PMD elements. Feed-forward subprocessor 1001 receives as inputs N pairs of $E_x(t)$ and $E_y(t)$ samples and supplies as its output the best guesses of parameters $\theta_1^1, \delta\phi^1,$ and $\tau_{DGD}^1 \ldots \theta_1^M, \delta\phi^M,$ and $\tau_{DGD}^M$. Real-time subprocessor 1002 receives as inputs the N pairs of $E_x(t)$ and $E_y(t)$ samples as well as the best guesses of the parameters supplied by feed-forward subprocessor 1001, and supplies as outputs the N pairs of $E_x(t)$ and $E_y(t)$ samples using the methods described hereinabove.

As M increases, the PMDC capability also increases. However, the needed computation power to perform the PMDC calculations increases as well. Thus, there is a tradeoff between required computation power and the PMDC that is performed. Note that oftentimes setting M=2 is sufficient to provide better than first order PMD compensation without requiring a severe increase in processing power. For further simplification, the guess values for $\tau_{DGD}^1 \ldots \tau_{DGD}^M$ can be fixed to a fraction of the symbol period, e.g., 0.4 $T_S$, as noted hereinabove.

FIG. 11 shows high level block diagram of arrangement 1100 suitable to be used to make up each of PUs 505 but which is arranged to treat the fiber as if it was made up of 2 segments each having DGD values each fixed to 0.4 $T_S$.

Note that, in accordance with an aspect of the invention, the digital PMD compensation schemes described above may also be employed with so-called "dual-polarization coherent-detection" receivers, where digital representations of two orthogonal polarization components of the received optical signal are obtained. A typical dual-polarization coherent-detection receiver with DSP is shown in "Uncompensated Transmission of 86 Gbit/s Polarization Multiplexed RZ-QPSK over 100 km of NDSF Employing Coherent Equalization" by Fludger et al., which was published as ECOC'06 post-deadline paper Th4.3.3, which is incorporated by reference as if fully set forth herein. FIG. 12 shows an exemplary high level block diagram of arrangement 1200 which is suitable to be used to make up each of PUs 505 but which is arranged for use with a coherent-detection receiver, in accordance with an aspect of the invention.

As is well known, such coherent detection receivers employ, an optical local oscillator (OLO) that provides an absolute phase reference for both received polarization components. As a result, there is no uncertainty in the additional phase difference $\delta\phi_2$ due to the field reconstruction process. Consequently, $\delta\phi_2$ does not need to be estimated in real-time subprocessor 1202, and instead can be estimated in feed-forward subprocessor 1201 so that the computational effort in the real-time subprocessor is much reduced. Typically, $\delta\phi_2$ changes at a very low speed, e.g., <1 KHz, so feed-forward subprocessor 1201 only needs to update $\delta\phi_2$ at a much lower speed than the signal date rate.

Figure 13:
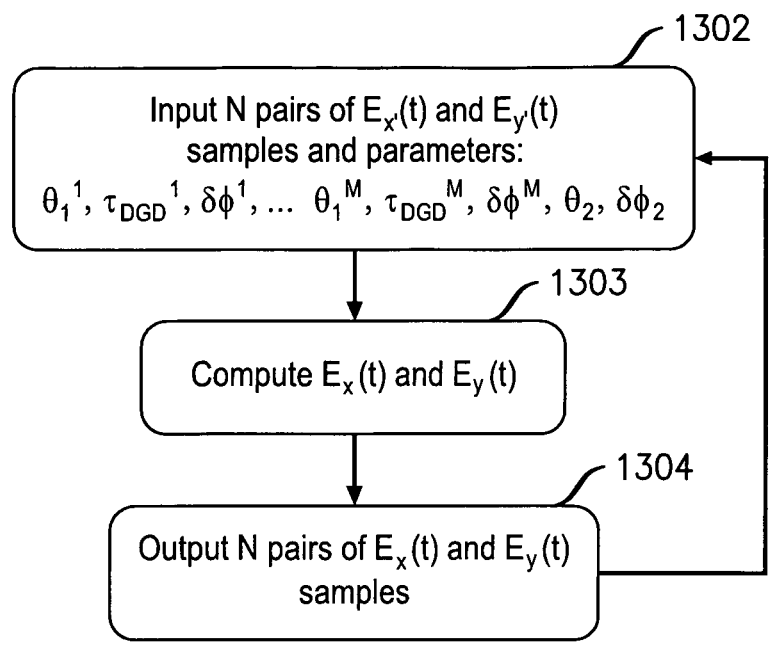
FIG. 13, shows an exemplary process, expressed in flow-chart form, that is performed in the real-time subprocessor of FIG. 12, in one embodiment of the invention.

FIG. 13, similar to FIG. 8, shows an exemplary process, expressed in flow-chart form, that is performed in real-time subprocessor 1202, in one embodiment of the invention. In step 1302 N pairs of $E_x(t)$ and $E_y(t)$ samples, as well as the best guesses of parameters $\theta_1, \theta_2, \delta\phi, \delta\phi_2,$ and $\tau_{DGD}$ for each of M virtual segments obtained by feed-forward subprocessor 1201, are received. Next, step 1303 computes $E_x(t)$ and $E_y(t)$ using Eq. (11). In step 1305 the N pairs of $E_x(t)$ and $E_y(t)$ samples are supplied as outputs and control passes back to step 1302 to process the next N pairs of $E_x(t)$ and $E_y(t)$ samples.

As mentioned hereinabove, to simplify, the DGD values can be fixed, e.g., each equal to about 0.4 Ts. Also, M can be chosen to be 2.

Once the original signal field is obtained, further compensation for other impairments, e.g., chromatic dispersion and/or self-phase modulation, and data recovery following suitable demodulation, can be performed to extract the data content from at least on generic polarization, using compensation for other impairments unit 152, demodulation unit 154, and data recovery unit 155.

A practical issue with the use of differential detection is that it employs ODIs, which typically exhibit polarization-dependent phase shift (PDPS). In other words, generally, the phase offset between the two arms of an ODI, $\phi$, is dependent on the polarization state of the optical signal. When the signal polarization is aligned with one of the two characteristic polarization orientations of the ODI, the phase offset $\phi$ reaches its maximum or its minimum. The PDPS is the difference between the maximum and the minimum phase offsets.

There are three common types of ODI: 1) fiber-based, 2) planar lightwave circuit (PLC)-based, and 3) free-space optics-based. The PDPS of a fiber-based ODI is typically due to the birefringence of the fiber resulting from mechanical stress. The PDPS of a PLC-based ODI is typically due to the birefringence of the waveguide structure of the PLC. The PDPS of a free-space optics based ODI is typically due to the polarization-dependent phase delay of the beam splitter used in forming the two optical interference paths. The PDPS can range from about 2 degrees (0.035 rad.) to about 20 degrees (0.35 rad.), the particular value for any ODI depending on its design.

The field reconstruction process as described herein relies on the phase difference estimation at multiple sampling locations. If the signal polarization is not aligned with one of the two characteristic polarization orientations of the ODI, the PDPS will accumulate as the number of sampling points increases and prevent accurate phase estimation. Thus, it is preferred to align PBS 101 in such a way that the polarization of each of the two split signals, i.e., $E_{x'}$ and $E_{y'}$ is aligned with one of the two characteristic polarization orientations of the ODIs. This can be achieved by using, e.g., 1) polarization-maintaining fibers with suitable orientations to connect the two outputs of PBS 101 with the two inputs of ODI pairs 105-106 and 107-108, or 2) polarization-maintaining free space optical connections between PBS 101 and the two inputs of ODI pairs 105-106 and 107-108 when the ODIs are free-space optics based.

Figure 2:
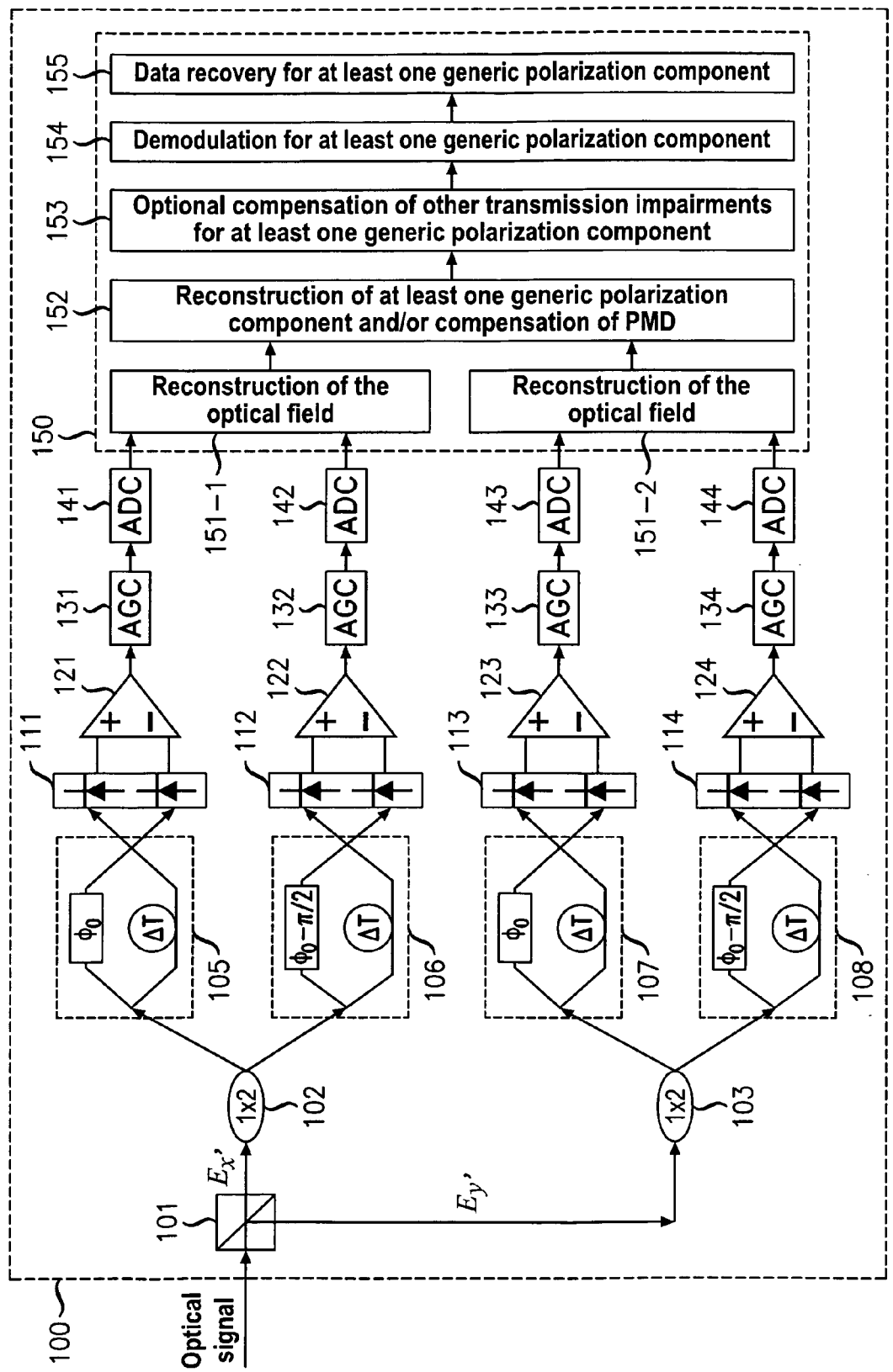
FIG. 2 shows an embodiment of the invention similar to that shown in FIG. 1 but in which the intensity detection branches are omitted.

FIG. 2 shows an embodiment of the invention similar to that shown in FIG. 1 but in which the intensity detection branches are omitted. In accordance with an aspect of the invention, the intensity profile for each polarization component is approximated from the absolute value of its respective one of the complex waveforms rather than directly recovered from the received optical signal.

Figure 3:
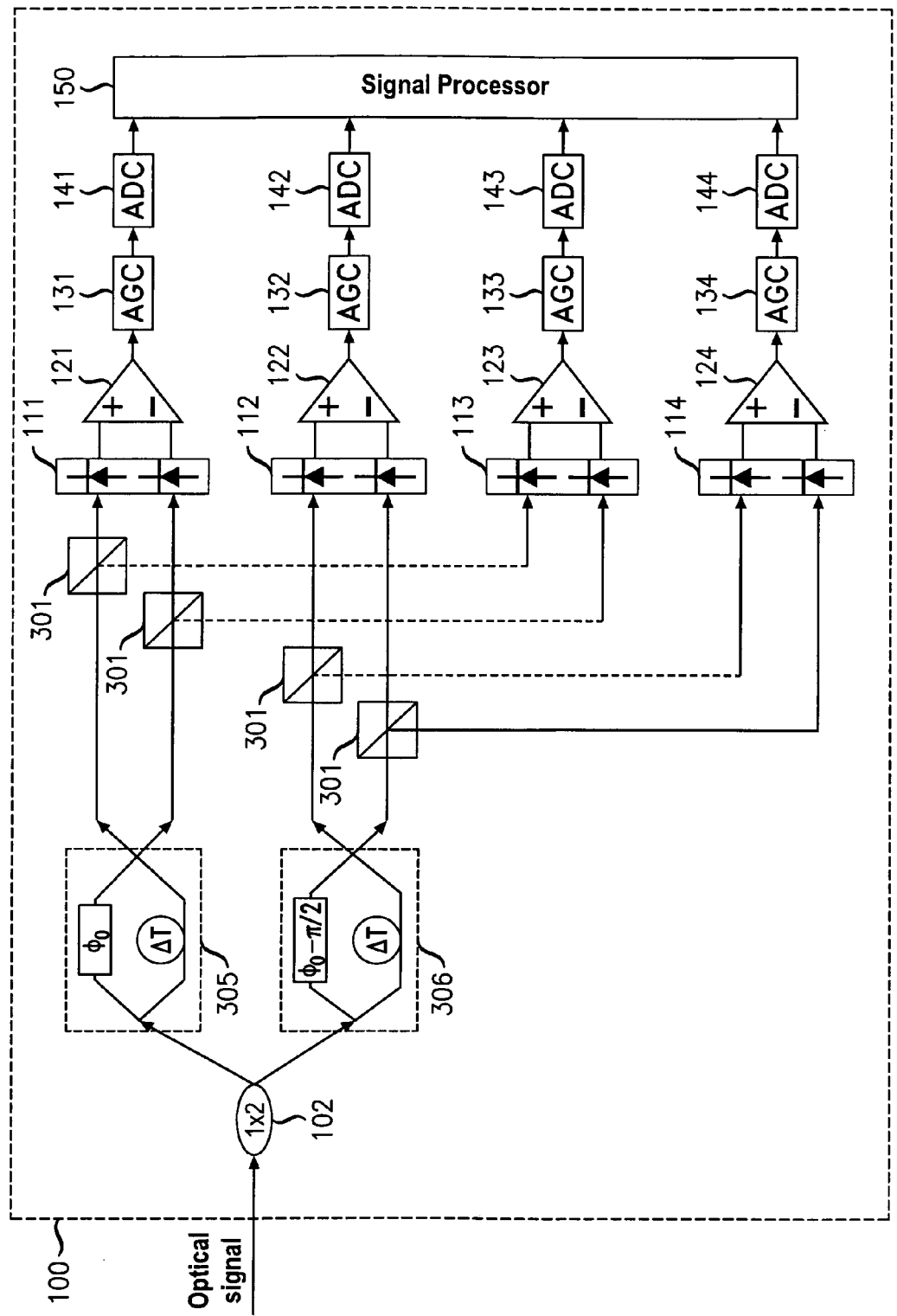
FIG. 3 shows another embodiment of the invention similar to that shown in FIG. 1 but which employs only a single I/Q ODI pair.

FIG. 3 shows another embodiment of the invention similar to that shown in FIG. 1 but which employs only a single I/Q ODI pair. This is achieved by eliminating PBS 101 of FIG. 1 and employing in lieu thereof four PBSs 301 at the four outputs of the first I/Q ODI. Furthermore, as in FIG. 2, the intensity detection branches are omitted and the intensity profile for each polarization component is approximated rather than directly recovered from the received optical signal. Advantageously, the cost of the overall arrangement, as with respect to the arrangement of FIG. 1, is significantly reduced.

In the embodiment of FIG. 3 the received signal is supplied directly into a single polarization-independent I/Q ODI pair made up of ODIs 305 and 306, whose four outputs are each connected to a respective one of PBSs 301 with the same polarization orientation. The eight outputs from PBSs 301, consisting of four x'-polarized outputs and four y'-polarized outputs, are then treated in the same manner as the outputs of the I/Q ODI pairs of FIG. 1, i.e., detected by balanced detectors whose outputs are sampled, after optional amplification and gain control, by a respective ADC. The sampled waveforms are then processed to obtain a digital representation of the signal optical field as described hereinabove.

As will be readily understood by those of ordinary skill in the art, the instant invention may be applied to optical differential phase-shift keying (DPSK) signals, such as differential binary phase-shift keying (DBPSK) and differential quadrature phase-shift keying (DQPSK) signals, since ODI(s) and balanced detection are commonly used for DPSK detection. Furthermore, this invention may also be applied to amplitude-shift keying (ASK), combined DPSK/ASK, and differential QAM.

What is claimed is:

1. An optical receiver, comprising:
a dual-polarization direct differential receiver portion that supplies as an output electronic analog representations of real and imaginary parts of two complex waveforms each of which contains information about phase differences between a plurality of time locations that are spaced by a prescribed amount for each respective one of two orthogonal polarization components of a received optical signal; and
a signal processor, coupled to said dual-polarization direct differential detection receiver portion, for developing a digital representation of an intensity and a phase profile representing at least one generic polarization component of said received optical signal.

2. The invention as defined in claim 1 wherein said signal processor develops said digital representation of an intensity and a phase profile representing at least one generic polarization component of said received optical signal using information from both of said electronic analog representations of said real and imaginary parts of said two complex waveforms.

3. The invention as defined in claim 1 wherein said signal processor further comprises:
means for developing a digital representation of said optical field of each of said two orthogonal polarization components of said received optical signal; and
means for developing a digital representation of the optical field of at least one generic polarization component of the optical signal by jointly processing said digital representations of said optical fields of said two orthogonal polarization components of said received signal.

4. The invention as defined in claim 1 wherein said two orthogonal polarization components of said received optical signal are defined by at least one polarization beam splitter.

5. The invention as defined in claim 1 wherein said dual-polarization direct differential detection receiver further comprises a direct intensity detection unit to obtain an intensity profile of said received optical signal.

6. The invention as defined in claim 5 wherein said direct intensity detection unit is a photodiode.

7. The invention as defined in claim 1 further comprising an analog to digital converter unit, said analog to digital converter unit converting said real and imaginary parts of said complex waveform to respective digital representations thereof and supplying said digital representation of real and imaginary parts of said complex waveform to said signal processor.

8. The invention as defined in claim 7 further comprising an automatic gain control unit interposed between said direct differential detection receiver and said analog to digital converter.

9. The invention as defined in claim 8 wherein said analog to digital converter unit includes a plurality of analog to digital converters.

10. The invention as defined in claim 7 wherein said signal processor processes a group of samples of said digital representation of said real and imaginary parts of said complex waveform supplied by said analog to digital converter unit together.

11. The invention as defined in claim 10 wherein the size of said group is proportional to the maximum number of interacting optical symbols during optical transmission due to dispersive effects in an optical channel over which said received optical signal traveled.

12. The invention as defined in claim 1 wherein said signal processor further comprises means for compensating said digital representation of an intensity and a phase profile representing at least one said generic polarization component of said received optical signal for transmission impairment inflicted on said received optical signal by a channel over which said received optical field had traveled.

13. The invention as defined in claim 12 wherein said transmission impairment belongs to a group consisting of: polarization-mode dispersion, chromatic dispersion, and fiber nonlinear effects.

14. The invention as defined in claim 1 wherein said signal processor further comprises means, responsive to said digital representation of an intensity and a phase profile representing at least one said generic polarization component of said received optical signal, for performing demodulation and data recovery.

15. The invention as defined in claim 1 wherein said received optical signal was derived from two generic polarization components that were orthogonal to each other in terms of polarization when transmitted together from a transmitter.

16. The invention as defined in claim 1 wherein said optical signal is a polarization-multiplexed signal that comprises two generic polarization components that are orthogonal to each other.

17. The invention as defined in claim 1 wherein said signal processor further comprises:
a plurality of multiple parallel processing units each of whose inputs are coupled to a data demultiplexer and whose outputs are coupled to a data multiplexer.

18. The invention as defined in claim 17 wherein each of said processing units operates on a block-by-block basis, wherein each block includes a plurality of samples from each of said two orthogonal polarization components of said received signal.

19. The invention as defined in claim 17 wherein each of said processing units operates in parallel, processing a block of samples that correspond to a time period, and wherein each block being processed by a one of said processing units may contain samples that are, were, or will also be processed by another one of said processing units.

20. The invention as defined in claim 1 wherein said signal processor further comprises:
a processing unit operating on a block-by-block basis, wherein each block includes a plurality of samples from each of said two orthogonal polarization components of said received signal, said processing unit further comprising at least one feed-forward processor and at least one real time processor.

21. The invention as defined in claim 20 wherein said feed-forward processor updates outputs it supplies for use as inputs by said real-time processor at a slower rate than a rate at which said real-time processor performs calculations using said feed-forward processor outputs.

22. The invention as defined in claim 20 wherein said feed-forward processor determines values for $\theta_1$, $\tau_{DGD}$, $\delta\phi$, $\theta_2$, $\delta\phi_2$, where
$\theta_1$ is the angle between the two orthogonal polarization components of the original signal from the transmitter and the two PSP axes of the fiber at its input, $\tau_{DGD}$ is the PMD-induced DGD, $\delta\phi$ is the PMD-induced or birefringence-induced phase difference between the two PSPs, $\theta_2$ is the angle between the two characteristic orientations of a polarization beam splitter used to separate orthogonal components of said received signal and the two principle state of polarization axes of a fiber from which said received signal is received at said receiver, and $\delta\phi_2$ is the phase difference between the two reconstructed signal fields $E_{x'}$ and $E_{y'}$, but only supplies values for $\theta_1$, $\tau_{DGD}$, $\delta\phi$, $\theta_2$ to said real-time processor.

23. The invention as defined in claim 1 wherein said signal processor further comprises electronic polarization demultiplexing means for developing said at least one generic polarization component of said received optical signal by jointly processing said digital representations of said two orthogonal polarization components of said received optical signal.

24. The invention as defined in claim 23 wherein said electronic polarization demultiplexing means uses the following computation to obtain the optical fields of the two generic polarization components $E_x(t)$ and $E_y(t)$ of said received optical signal $$\begin{bmatrix} E_x(t) \\ E_y(t) \end{bmatrix} = \begin{bmatrix} \cos(\theta_1)[\cos(\theta_2)E_x \cdot (t - \tau_{DGD}) + \sin(\theta_2)E_y \cdot (t - \tau_{DGD}) \cdot e^{j\delta\phi_2}]e^{j\delta\phi} - \sin(\theta_1)[-\sin(\theta_2)E_{x'}(t) + \cos(\theta_2)E_{y'}(t)e^{j\delta\phi_2}] \\ \sin(\theta_1)[\cos(\theta_2)E_x \cdot (t - \tau_{DGD}) + \sin(\theta_2)E_y \cdot (t - \tau_{DGD}) \cdot e^{j\delta\phi_2}]e^{j\delta\phi} + \cos(\theta_1)[-\sin(\theta_2)E_{x'}(t) + \cos(\theta_2)E_{y'}(t)e^{j\delta\phi_2}] \end{bmatrix},$$

where $E_{x'}$ and $E_{y'}$ are the reconstructed optical fields of the into two orthogonal polarization components of said received optical signal separated by a polarity beam splitter, $\theta_1$ is the angle between the two orthogonal polarization components of the original signal from the transmitter and the two PSP axes of the fiber at its input, $\tau_{DGD}$ is the PMD-induced DGD, $\delta\phi$ is the PMD-induced or birefringence-induced phase difference between the two PSPs, $\theta_2$ is the angle between the two characteristic orientations of a polarization beam splitter used to separate orthogonal components of said received signal and the two principle state of polarization axes of a fiber from which said received signal is received at said receiver, and $\delta\phi_2$ is the phase difference between the two reconstructed signal fields $E_{x'}$ and $E_{y'}$, $\theta_1$ is the angle between one of the two generic orthogonal polarization components of the polarization-multiplexed signal at the input of the PBS and the orientation of the PBS, and $\phi_1$ is the optical phase difference between the two generic polarization components at the PBS input.

25. The invention as defined in claim 24 wherein said electronic polarization demultiplexing means adaptively optimizes values of parameters $\theta_1$ and $\phi_1$.

26. The invention as defined in claim 24 wherein said electronic polarization demultiplexing means adaptively optimizes values of parameters $\theta_2$, $\tau_{DGD}$, and $\phi_2$.

27. The invention as defined in claim 1 wherein said dual-polarization direct differential detection receiver comprises at least one I/Q optical delay interferometer pair.

28. The invention as defined in claim 27 wherein said dual-polarization direct differential detection receiver further comprises at least one polarization beam splitter that supplies that is arranged to couple one of said two orthogonal polarization components of said received optical signal to said at least one I/Q optical delay interferometer pair.

29. The invention as defined in claim 27 wherein said dual-polarization direct differential detection receiver further comprises at least one polarization beam splitter and wherein said at least one I/Q optical delay interferometer pair is arranged to supply at least one of its outputs to said at least one polarization beam splitter.

30. The invention as defined in claim 27 wherein said at least one I/Q optical delay interferometer pair has a delay equal to a prescribed amount.

31. The invention as defined in claim 27 wherein said delay of said I/Q ODI pair equals to the symbol period of one of said generic polarization components of said received optical signal that carries a single data modulation.

32. The invention as defined in claim 27 wherein said delay of said I/Q ODI pair is a fraction of the symbol period of a one of said generic polarization component of said received optical signal that carries a single data modulation.

33. The invention as defined in claim 27 wherein the in-phase (I) and quadrature (Q) branches of said I/Q ODI pair have a delay difference between them that corresponds to an optical phase difference of about $\pi/2$.

34. The invention as defined in claim 27 wherein said dual-polarization direct differential detection, receiver further comprises at least one polarization beam splitter coupled to said I/Q ODI pair and the two characteristic polarization orientations of said I/Q ODI pair are aligned with the polarization orientations of the two outputs of said optical polarization beam splitter.

35. The invention as defined in claim 27 wherein said I/Q ODI pair has a polarization dependent phase shift of less than about 3 degrees.

36. The invention as defined in claim 1 wherein said dual-polarization direct differential detection receiver further comprises four balanced intensity detectors, each of said balanced intensity detectors being coupled to a respective one of two branches of said I/Q ODI pair for a respective one of two polarization components separated by said polarization beam splitter.

37. The invention as defined in claim 1 wherein said dual-polarization direct differential detection receiver portion comprises at least one I/Q optical delay interferometer pair, at least one polarization beam splitter, and, four balanced intensity detectors, each of said balanced intensity detectors being coupled to a respective output branch of said at least one I/Q optical delay interferometer pair for a respective one of two orthogonal polarization components of a received optical signal that have been separated by said polarization beam splitter.

38. The invention as defined in claim 37 wherein said dual-polarization direct differential detection receiver portion further comprises four analog to digital converters that convert each output of said four balanced intensity detectors to a respective digital representation and wherein said signal processor is coupled to receive said digital representations and to employ information from each of said digital representations to develop said digital representation of an intensity and a phase profile representing at least one generic polarization component of said received optical signal.

39. The invention as defined in claim 38 wherein said at least one I/Q optical delay interferometer pair has a delay equal to about the inverse of the sampling rate of said four analog to digital converters.

40. A method for use in an optical receiver, the method comprising the steps of:
converting an optical signal that when received has two polarization components into a digital representation comprising an in phase and quadrature component for each of said polarization components using a dual-polarization direct differential receiver; and
jointly processing said digital representation of said in phase and quadrature component for each of said polarization components to develop therefrom a digital representation of an intensity and a phase profile representing at least one generic polarization component of said received optical signal.

41. The invention as defined in claim 40 wherein said converting step further comprises the steps of:
separating said optical signal into at least two polarization components;
creating a copy of each of said polarization components of said received optical signal;
delaying each of said copies by a prescribed amount, and interfering each of said copies with its respective original so as to separate said in phase and quadrature component for each of said polarization components; and
digitizing in phase and quadrature component for each of said polarization components.

42. The invention as defined in claim 40 wherein said converting step further comprises the steps of:
creating a copy of said received optical signal;
delaying said copy by a prescribed amount, and interfering said copy with said received optical signal so as to separate said in phase and quadrature components for said received optical signal; and
separating each of said in phase and quadrature components into at least two polarization components; and
digitizing in phase and quadrature components for each of said polarization components.

43. The invention as defined in claim 40 wherein said step of jointly processing further comprises the step of grouping samples of said digital representation of said in phase and quadrature component for each of said polarization components into blocks, wherein each block includes a plurality of samples from each of said polarization components of said received signal; and
wherein, in said step of jointly processing, said samples are processed on a block-by-block basis.

44. The invention as defined in claim 40 wherein said step of jointly processing determines two generic polarization components $E_x(t)$ and $E_y(t)$ of said received optical signal $$\begin{bmatrix} E_x(t) \\ E_y(t) \end{bmatrix} = \begin{bmatrix} \cos(\theta_1)[\cos(\theta_2)E_x \cdot (t - \tau_{DGD}) + \sin(\theta_2)E_y \cdot (t - \tau_{DGD}) \cdot e^{j\cdot\delta\phi_2}]e^{j\cdot\delta\phi} - \sin(\theta_1)[-\sin(\theta_2)E_{x'}(t) + \cos(\theta_2)E_{y'}(t)e^{j\cdot\delta\phi_2}] \\ \sin(\theta_1)[\cos(\theta_2)E_x \cdot (t - \tau_{DGD}) + \sin(\theta_2)E_y \cdot (t - \tau_{DGD}) \cdot e^{j\cdot\delta\phi_2}]e^{j\cdot\delta\phi} + \cos(\theta_1)[-\sin(\theta_2)E_{x'}(t) + \cos(\theta_2)E_{y'}(t)e^{j\cdot\delta\phi_2}] \end{bmatrix},$$

where $E_{x'}$ and $E_{y'}$ are reconstructed optical fields of said orthogonal polarization components of said received optical signal after separation by a polarization beam splitter,
$\theta_1$ is the angle between the two orthogonal polarization components of an original signal from a transmitter from which a signal that is received as said received signal is transmitted over a fiber having two principle state of polarization axes at its input, $\tau_{DGD}$ is the polarization-mode dispersion (PMD)-induced differential group delay (DGD), $\delta\phi$ is the PMD-induced or birefringence-induced phase difference between the two PSPs, $\theta_2$ is the angle between the two characteristic orientations of said polarization beam splitter and the two principle state of polarization axes of said fiber, and $\delta\phi_2$ is the phase difference between the two reconstructed signal fields $E_{x'}$ and $E_{y'}$, $\theta_1$ is the angle between one of the two generic orthogonal polarization components of the polarization-multiplexed signal at the input of said polarization beam splitter and the orientation of the said polarization beam splitter, and $\phi_1$ is the optical phase difference between the two generic polarization components at the said polarization beam splitter input.

45. An optical receiver, comprising:
a dual-polarization direct differential receiver that comprises:
at least one I/Q optical delay interferometer pair having four output branches;
at least one polarization beam splitter;
four balanced intensity detectors; and
four analog to digital converters;
said at least one I/Q optical delay interferometer, said at least one polarization beam splitter, said four balanced intensity detectors, and four analog to digital converters being arranged so as to produce an in phase and quadrature component for each of polarization component of a received optical signal that when received has two polarization components a signal processor, coupled to said four analog to digital converters for developing a digital representation of an intensity and a phase profile representing at least one generic polarization component of said received optical signal using information from both of said digital representations of said real and imaginary parts of said polarization components of said received optical signal supplied as output by said analog to digital converters.

46. The invention as defined in claim 45 wherein said signal processor further comprises:
a plurality of multiple parallel processing units each of whose inputs are coupled to a data demultiplexer and whose outputs are coupled to a data multiplexer.

47. The invention as defined in claim 45 wherein said signal processor further comprises:
a processing unit operating on a block-by-block basis, wherein each block includes a plurality of samples from each of said two orthogonal polarization components of said received signal, said processing unit further comprising at least one feed-forward processor and at least one real time processor.

* * * * *